US00RE46976E

(19) United States
(12) Reissued Patent
Makii

(10) Patent Number: US RE46,976 E
(45) Date of Reissued Patent: Jul. 31, 2018

(54) IMAGE PROCESSING DEVICE, IMAGE PROCESSING METHOD, AND IMAGE PROCESSING PROGRAM

(71) Applicant: Sony Corporation, Tokyo (JP)

(72) Inventor: Tatsuo Makii, Tokyo (JP)

(73) Assignee: Sony Corporation (JP)

(21) Appl. No.: 14/470,294

(22) Filed: Aug. 27, 2014

Related U.S. Patent Documents

Reissue of:
(64) Patent No.: 8,564,693
Issued: Oct. 22, 2013
Appl. No.: 12/451,726
PCT Filed: Jun. 5, 2008
PCT No.: PCT/JP2008/060733
§ 371 (c)(1),
(2) Date: Nov. 24, 2009
PCT Pub. No.: WO2008/150027
PCT Pub. Date: Dec. 11, 2008

(30) Foreign Application Priority Data

Jun. 6, 2007 (JP) ..... P2007-150071

(51) Int. Cl.
*H04N 5/262* (2006.01)
*G03B 13/00* (2006.01)
(Continued)

(52) U.S. Cl.
CPC ..... *H04N 5/2628* (2013.01); *G06T 7/521* (2017.01); *G06T 7/571* (2017.01); *H04N 5/23293* (2013.01); *H04N 5/2621* (2013.01)

(58) Field of Classification Search
CPC ..... H04N 5/23293; H04N 5/2621; H04N 5/2628; G06T 7/571; G06T 7/521
See application file for complete search history.

(56) References Cited

U.S. PATENT DOCUMENTS 5,168,532 A * 12/1992 Seppi et al. ..... 382/270
5,185,667 A * 2/1993 Zimmermann ..... 348/207.99
(Continued)

FOREIGN PATENT DOCUMENTS

EP 1950954 A1 7/2008
JP 07-021365 A 1/1995
(Continued)

OTHER PUBLICATIONS

Definitions of "apparatus" and "instruction," The Authoritative Dictionary of IEEE Standards Terms, 7th Ed., IEEE, Inc., New York, NY, Dec. 2000.*
(Continued)

*Primary Examiner* — Yuzhen Ge
(74) *Attorney, Agent, or Firm* — Lerner, David, Littenberg, Krumholz & Mentlik, LLP

(57) ABSTRACT

An object plane is set, and appropriate image processing is performed according to the setting of the object plane. An image processing apparatus has a controller (7). The controller (7) receives image data for a captured image and distance information on the distance to a designated point in the captured image, sets an object plane (100) containing the designated point, converts the distance information to the information on the distance from the object plane, and performs predetermined image processing according to the converted distance information.

18 Claims, 36 Drawing Sheets

(51) Int. Cl.

| | |
|---|---|
| ***H04N 5/232*** | (2006.01) |
| ***G06T 7/521*** | (2017.01) |
| ***G06T 7/571*** | (2017.01) |

(56) References Cited

U.S. PATENT DOCUMENTS

| | | | | |
|---|---|---|---|---|
| 5,231,514 | A * | 7/1993 | Nakamura | 358/444 |
| 5,313,306 | A * | 5/1994 | Kuban et al. | 348/65 |
| 5,359,363 | A * | 10/1994 | Kuban et al. | 348/36 |
| 5,384,588 | A * | 1/1995 | Martin et al. | 348/14.1 |
| 5,990,941 | A * | 11/1999 | Jackson et al. | 348/207.99 |
| 6,072,529 | A * | 6/2000 | Mutze | 348/351 |
| 6,201,574 | B1 * | 3/2001 | Martin | 348/315 |
| 6,449,004 | B1 | 9/2002 | Okisu et al. | 348/44 |
| 6,496,598 | B1 * | 12/2002 | Harman | 382/154 |
| 6,900,841 | B1 * | 5/2005 | Mihara | 348/345 |
| 6,914,599 | B1 * | 7/2005 | Rowe et al. | 345/420 |
| 7,064,789 | B1 * | 6/2006 | Shono | 348/351 |
| 7,268,803 | B1 | 9/2007 | Murata et al. | 348/218.1 |
| 7,627,196 | B2 * | 12/2009 | Suzuki et al. | 382/286 |
| 7,714,936 | B1 * | 5/2010 | Martin et al. | 348/576 |
| 8,290,264 | B2 * | 10/2012 | Kim et al. | 382/173 |
| 2002/0080242 | A1 * | 6/2002 | Takahashi et al. | 348/208 |
| 2004/0051782 | A1 * | 3/2004 | Bradski | 348/36 |
| 2004/0263646 | A1 * | 12/2004 | Cutler | 348/239 |
| 2005/0220358 | A1 * | 10/2005 | Blonde et al. | 382/264 |
| 2006/0232665 | A1 * | 10/2006 | Schowengerdt et al. | 348/51 |
| 2007/0019917 | A1 * | 1/2007 | Bayindir et al. | 385/123 |
| 2007/0097381 | A1 * | 5/2007 | Tobiason et al. | 356/604 |
| 2008/0309815 | A1 * | 12/2008 | Nanjo et al. | 348/345 |

FOREIGN PATENT DOCUMENTS

| | | | |
|---|---|---|---|
| JP | 08-163428 | A | 6/1996 |
| JP | 09-289610 | A | 11/1997 |
| JP | 2000-207549 | A | 7/2000 |
| JP | 2002-312759 | A | 10/2002 |
| JP | 2003-348430 | A | 12/2003 |
| JP | 2007-124609 | A | 5/2007 |

OTHER PUBLICATIONS

American Heritage College Dictionary 261 (4th ed. 2002), definition of circuitry and processor.*

Supplementary European Search Report, EP 08765504, dated Oct. 25, 2010.

Communication from EP Application 08765504, dated Nov. 5, 2010.

Office Action from Japanese Application No. 2008-133498 dated Mar. 13, 2011.

* cited by examiner

| | |
|---|---|
|  | IFT MOVEMENT<br>MOVE LENS OR FILM POSITION LEFT OR RIGHT |
|  | RISE/FALL MOVEMENT<br>MOVE LENS OR FILM POSITION UP OR DOWN |
|  | TILT MOVEMENT<br>TILT LENS OR FILM POSITION FORWARDS OR BACKWARDS WITH RESPECT TO OPTICAL AXIS OF LENS |
|  | SWING MOVEMENT<br>SWING LENS OR FILM ON AXIS PERPENDICULAR TO OPTICAL AXIS OF LENS |

PRIOR ART

PRIOR ART

IMAGE PROCESSING DEVICE, IMAGE PROCESSING METHOD, AND IMAGE PROCESSING PROGRAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

The present application is a *reissue application of U.S. Pat. No. 8,564,693 which issued on Oct. 22, 2013 which is a* national phase entry under 35 U.S.C. § 371 of International Application No. PCT/JP2008/060733 filed Jun. 5, 2008, published on Dec. 11, 2008 as WO 2008/150027 A1, which claims priority from Japanese Patent Application No. JP 2007-150071 filed in the Japanese Patent Office on Jun. 6, 2007*, and Japanese Patent Application No. JP 2008-133498 filed in the Japanese Patent Office on May 21, 2008.*

TECHNICAL FIELD

The present invention relates to an image processing apparatus and, more particularly, to an image processing apparatus, image processing method and image processing program for performing image processing, such as blurring, according to a set object plane.

BACKGROUND ART

With a conventional imaging apparatus such as a film camera or digital camera, imaging may be performed by using camera movement of an imaging lens. "Camera movement" means lens operation (or camera operation) for changing imaging effect by breaking the basic relation between the imaging apparatus and the imaging lens in which the optical axis of the lens is perpendicular to the film plane (or imaging device plane) at the center of the imaging screen. Such operations are collectively called "camera movement". Camera movement allows the perspective deformation of buildings or the like to be corrected, the depth of field to be controlled, and the camera's reflection in a mirror or the like to be avoided.

Camera movement can be broadly classified as shown in FIG. 35.

Camera movement includes two groups of operations. One is "displacement" including "shift" and "rise/fall". The other includes "swing" and "tilt". The former translates the lens plane (or the film plane/imaging device plane) while maintaining the perpendicular relation between the optical axis of the imaging lens and the film plane (or the imaging device plane). In other words, the position at which the optical axis is perpendicular to the screen is translated off the center of the screen. The latter breaks the perpendicular relation between the optical axis of the imaging lens and the film plane (or the imaging device plane). In other words, the crossed angle between the optical axis and the film plane (or the imaging device plane) are changed from 90°.

In a strict sense, only the former "displacement" corresponds to camera movement. However, in a general sense, both the former and latter are often confused and collectively called "camera movement". Then, in the following, for convenience, "shift," "rise/fall," "tilt," and "swing" are called shift movement, rise/fall movement, tilt movement, and swing movement, respectively.

These are described in more detail below. "Shift movement" means moving the optical axis of the lens (or the film plane/the imaging device plane) left or right, which is used for improving composition or correcting distortion. This operation allows changing the composition in the horizontal direction without moving the camera itself. For example, using shift movement, it is possible to perform imaging at the position shifted left or right from the center of a mirror and obtain a photograph as if taken at the center of the mirror. "Rise/fall movement" means moving the lens plane (or the film plane/the imaging device plane) up or down, which is also used for improving composition or correcting distortion as with shift movement. Rise/fall movement allows improving composition in the vertical direction without extending the elevator or leg of a tripod. When shooting looking up at a tall building with a normal camera, the far part of the building may appear smaller and tapered in a photograph. Rise/fall movement may be used for perspective control to shoot the building so that it will appear upright.

"Tilt movement" means tilting the lens plane (or the film plane/the imaging device plane) forwards or backwards with respect to the optical axis of the lens, which is used generally for changing the position of the plane of sharp focus or correcting distortion. Tilt movement allows focusing over the wide range from near field to far field even at full aperture. "Swing movement" means swinging the lens plane (or the film plane/the imaging device plane) on the axis perpendicular to the optical axis of the imaging lens, which effect is similar to that of tilt movement described above.

For example, one principle for making depth of field look deeper by manipulating the object plane using tilt movement is known as "Scheimpflug principle". In the following, an imaging method using the Scheimpflug principle is briefly described with reference to FIG. 36. The Scheimpflug principle says that, generally, three planes extended from the object plane, the lens plane, and the imaging plane intersect atone line. Specifically, according to this principle, when an imaging device plane 400 and the principal plane of an imaging lens 401 are tilted to each other, an object plane 402 tilted so as to intersect with the imaging device plane 400 and the principal plane of the imaging lens 401 at one ridge line will be brought into sharp focus. In another recently known imaging method, the object plane is changed by adjusting the tilt angle with respect to the optical axis of the imaging lens 401.

In yet another known imaging method, for example, by using the camera movement effect according to the above method, towns and buildings are shot as if they were miniatures by adjusting the object plane, in addition to making depth of field look deeper by manipulating the object plane.

The above described imaging methods provide camera movement effects by manipulating an optical system. On the other hand, examples of imaging methods providing camera movement effects by digital processing include an imaging apparatus for performing correction by camera movement (shift movement, rise/fall movement) using image processing, without using a special lens (see JP-A-8-163428, for example), and a digital camera for converting an image that is already given a camera movement effect (for example, an image of a white board shot from an obliquely lower position) to a pseudo front image based on a manually set tilt angle and ranging data to an object (see JP-A-9-289610).

However, the technology disclosed in JP-A-8-163428 provides geometric correction similar to camera movement effect electronically with digital technology, but does not provide an imaging method corresponding to swing movement and tilt movement using image processing.

Also, the technology disclosed in JP-A-9-289610 provides a method for imaging by converting an image shot from an oblique direction to a pseudo front image, but does not provide an imaging method corresponding to swing movement and tilt movement using image processing, as in JP-A-8-163428.

In addition, obtaining by image processing an image that is given an effect equal to that of imaging with such a shallow depth of field and tilted object plane that imaging may not be performed with an actual imaging device/focal length, and obtaining by image processing an image that is given an effect equal to that of imaging with shallow depth of field have not been achieved yet.

DISCLOSURE OF THE INVENTION

In view of the above, the present invention is directed to perform image processing, such as blurring, according to a set object plane.

An image processing apparatus in accordance with a first aspect of the invention includes: an object plane setting section for setting an object plane based on distance information corresponding to a point designated by a user in a displayed image based on image data; a distance information conversion section for converting the distance information of the image data according to the object plane; and an image processing section for performing image processing on the image data based on the distance information converted by the distance information conversion section.

An image processing method in accordance with a second aspect of the invention includes the step of: setting an object plane based on distance information corresponding to a point designated by a user in a displayed image based on image data; converting the distance information of the image data according to the object plane; and performing image processing on the image data based on the converted distance information.

An image processing program in accordance with a third aspect of the invention causes a computer to execute an image processing method comprising the step of: setting an object plane based on distance information corresponding to a point designated by a user in a displayed image based on image data; converting the distance information of the image data according to the object plane; and performing image processing on the image data based on the converted distance information.

Thus, according to the first to third aspects, an object plane is set, and appropriate image processing is performed according to the setting of the object plane.

According to the invention, an image processing apparatus, image processing method and image processing program for performing image processing, such as blurring, according to the set object plane can be provided.

BEST MODE FOR CARRYING OUT THE INVENTION

The best mode for carrying out the present invention (simply referred to as embodiments hereinafter) is described in detail below with reference to the drawings.

(First Embodiment)

First, the basic principle of an image processing apparatus in accordance with a first embodiment of the invention is described with reference to a conceptual drawing shown in FIG. 1. In this figure, the image processing apparatus in accordance with the first embodiment is exemplarily applied to a digital camera as an imaging apparatus, but is not limited thereto.

Figure 1:
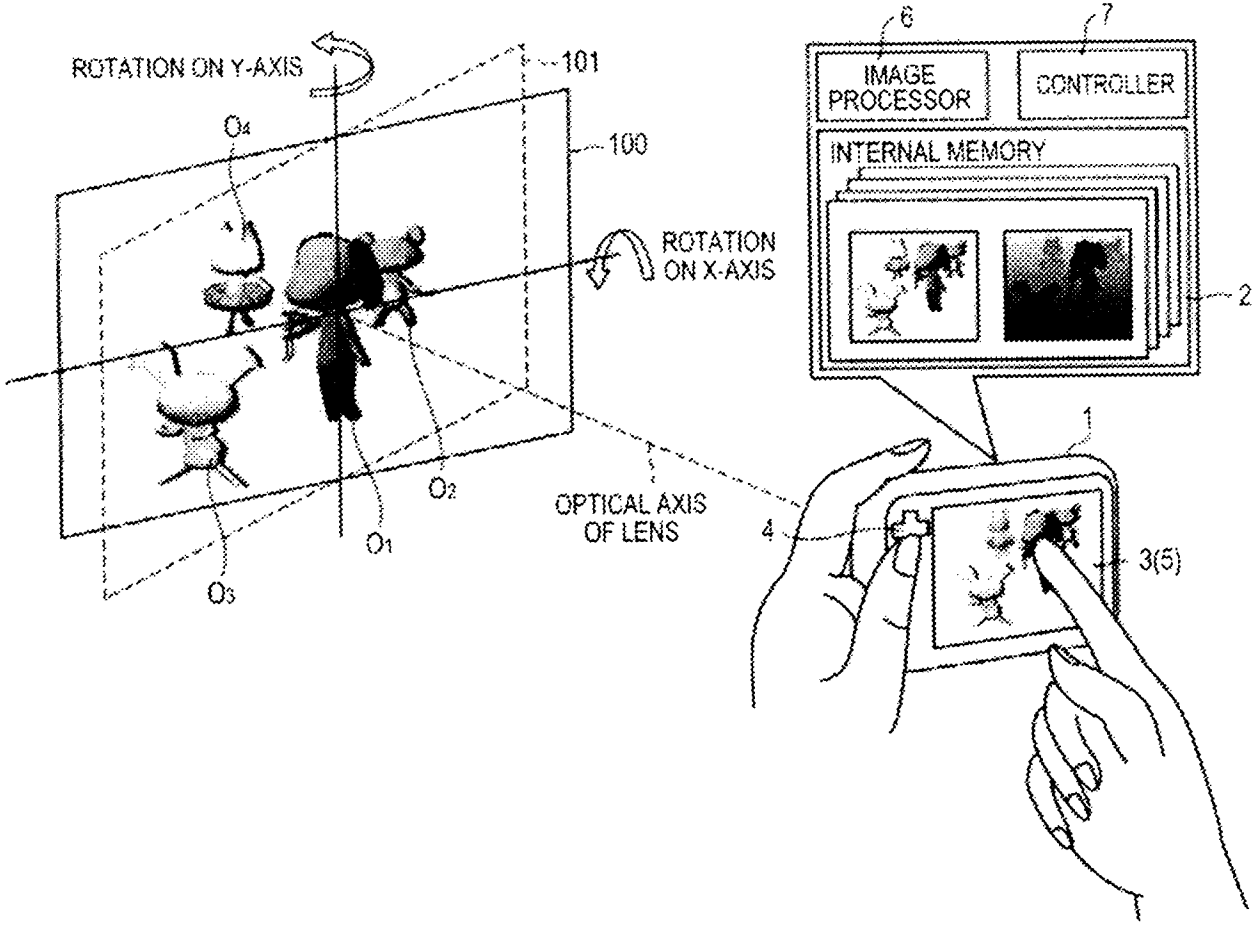
FIG. 1 is a conceptual drawing showing the basic principle of an image processing apparatus in accordance with a first embodiment of the invention.

As shown in FIG. 1, when imaging is performed by an imaging apparatus 1, predetermined image processing is performed, and then image data and distance information (distance data) are stored in an internal memory 2. The image data is read out as appropriate and the captured image is displayed on a display 3 such as a liquid crystal display (LCD).

While looking at the captured image displayed on the display 3, a user designates one or more designated points (desired points) by operating a touch panel 5, and arbitrarily sets the tilt direction and the tilt angle of an object plane by operating a cross-shaped key 4 (consisting of Up, Down, Left, and Right buttons, for example).

In this example, the internal memory 2 provides a storage capability, for example. The touch panel 5 provides a designation capability, for example. The cross-shaped key 4 provides a setting capability, for example.

In this configuration, a controller 7 sets the object plane based on the distance information for each region of the displayed image according to the image data, and based on the distance information of the designated point (s) designated by the user in the displayed image. Then the controller 7 converts the distance information for each point related to the image data, according to the object plane. An image processor 6 performs image processing on the image data based on the converted distance information. Thus, in this configuration, the controller 7 provides an object plane setting capability and a distance information conversion capability, and the image processor 6 provides an image processing capability.

Figure 2:
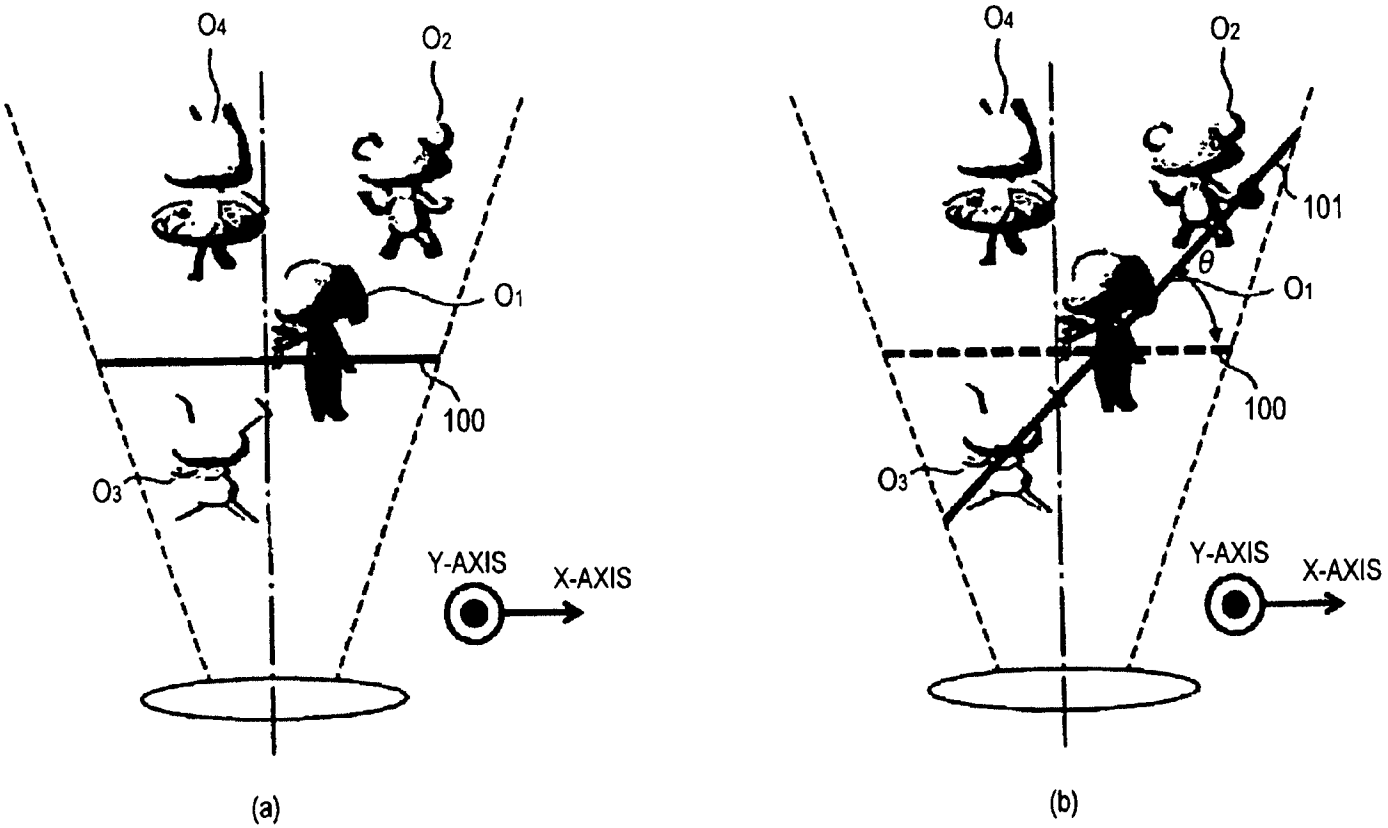
FIGS. 2(a) and (b) are conceptual drawings illustrating the setting of an object plane.

Specifically, as shown in FIG. 2(a), when the user designates one point on the touch panel 5, a plane that contains the designated point designated by the user and is perpendicular to the optical axis of an imaging lens (optical axis of light incident upon an imager) is temporarily set as object plane 100, and then, the tilt direction and tilt angle of the object plane 100 become able to be set by rotating the object plane 100 on the X-axis and on the Y-axis, the two axes crossing at the designated point. The designated point is a point contained in the main object to be photographed.

For example, when the Left or Right button of the cross-shaped key 4 is operated, the object plane 100 rotates on the Y-axis, and the tilt direction and tilt angle corresponding to the rotation are set. Also, for example, when the Up or Down button of the cross-shaped key 4 is operated, the object plane 100 rotates on the X-axis, and the tilt direction and tilt angle corresponding to the rotation are set. As an example, FIG. 2(b) shows an object plane 101, in which an operation of the cross-shaped key 4 cause a rotation on the Y-axis to set the direction of the tilt around the Y-axis and to set the angle of the tilt to θ shown in the figure. However, rotating is not necessary. The object plane 100 can be set only by designating one point even without rotating.

When the desired setting of the object plane 100 (101) using the touch panel 5 and the cross-shaped key 4 is completed, an image on which predetermined image processing such as blurring, is performed by the image processor 6 in the imaging apparatus are displayed on the display 3 (or an external display not shown).

More specifically, in this example, the distance information for each point of the image data are converted based on the coordinates of the designated point, then image processing such as blurring is performed on the image data based on the converted distance information. When the object plane is changed by rotating the object plane on the designated point according to the user designation, the distance information for each point of the image data is converted based on the coordinates of the designated point and the angle of the rotation. Then image processing such as blurring is performed on the image data based on the converted distance information. In this example, the image processor 6 provides this image processing capability, for example.

The distance information used in this embodiment is what is called depth map, which is the individual distance data for one or more points in the captured image. It should be noted that, when an image is most finely divided into regions, each region corresponds to a pixel. In this case, depth map data could mean distance data for each of a plurality of pixels.

Methods for obtaining this distance information include TOF (time of flight) method and depth from defocus method. TOF method is a technique for determining the distance to an object based on the delay time during which a light is emitted from a light source, is reflected by the object, and reaches a sensor, and the speed of light. These methods are described in detail later.

As described above, for the image processing apparatus in accordance with the first embodiment, when one point in the captured image is designated, a plane that contains the designated point and is perpendicular to the optical axis is set as object plane. More specifically, a plane that contains the designated point and a point having the same distance information as that of the designated point is set as object plane.

Furthermore, for example, when two or more points contained in the captured image are designated using the touch panel 5, the distance information for these two or more points are read out from the internal memory 2, the tilt direction and tilt angle of the object plane with respect to the optical axis of the lens are individually calculated, and the object plane is set based on the tilt direction and tilt angle, under control of the controller 7. A method for calculating the tilt direction and tilt angle is described in detail later.

In this way, the object plane perpendicular to the optical axis of the imaging lens, or one point not to be blurred, is designated using, e.g., the touch panel 5, and predetermined image processing such as blurring is performed based on the distances from the object plane. This provides an image given an effect equal to that of "imaging with such a shallow depth of field and tilted object plane" that imaging may not be performed by adjusting a focal length by adjusting the performance of an actual imaging device, lens position, and the like, without using optical camera movement effects (tilt movement or swing movement). Thus, when the image processing apparatus in accordance with the first embodiment is applied to an imaging apparatus, an image as if obtained using advanced techniques with a digital single lens reflex camera or large format camera can be easily obtained.

Next, an image processing apparatus in accordance with the first embodiment of the invention employing the above-described basic principle is described in detail with reference to a block diagram shown in FIG. 3. In this figure, the image processing apparatus is exemplarily applied to an imaging apparatus such as a digital camera, but is not limited thereto.

Figure 3:
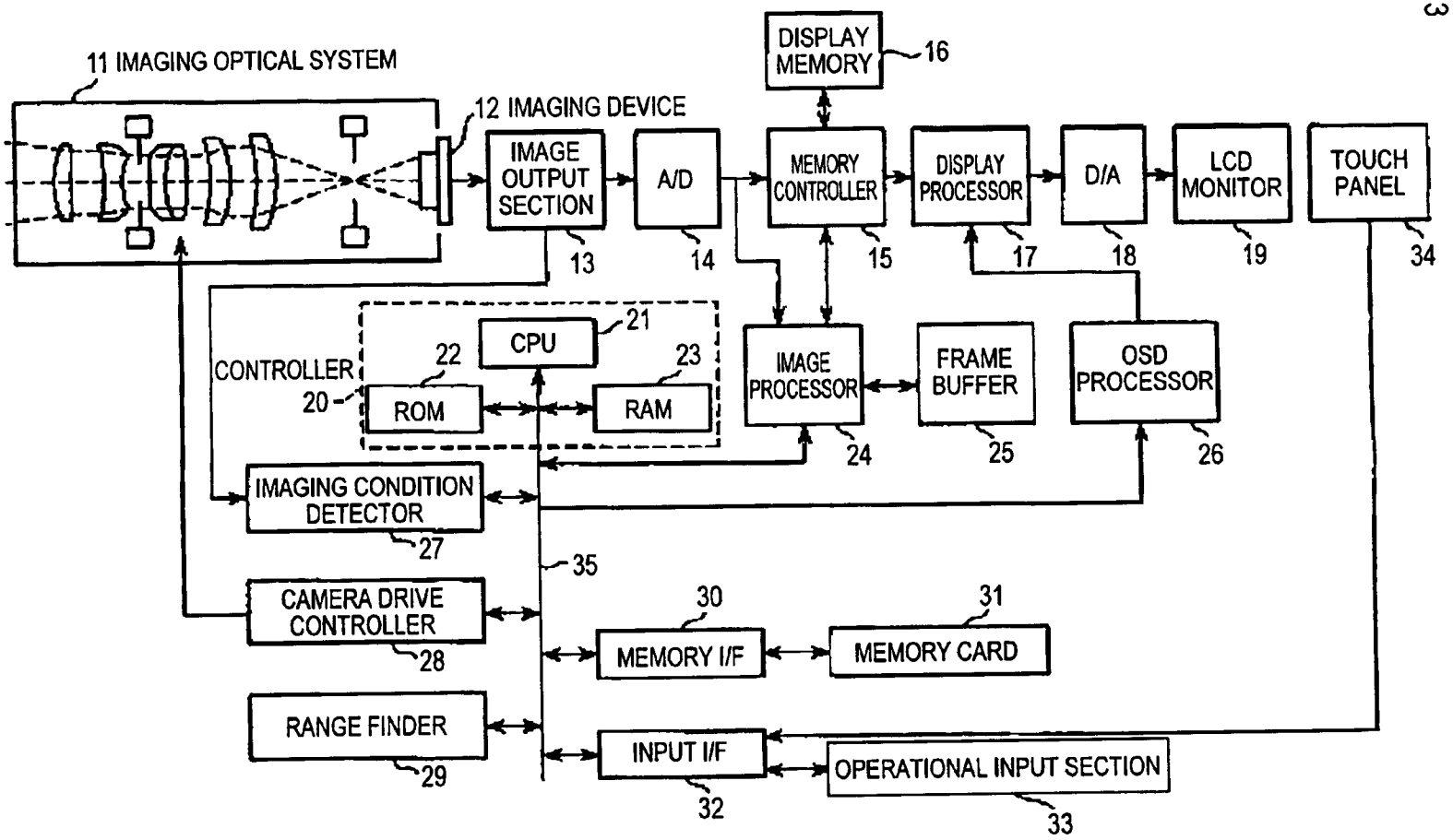
FIG. 3 shows a configuration of the image processing apparatus in accordance with the first embodiment of the invention.

As shown in FIG. 3, an imaging device 12 is placed on the optical axis of an imaging optical system 11 and is connected to an image output section 13. The image output section 13 is connected to an analog-to-digital (A/D) converter 14. The A/D converter 14 is connected to a memory controller 15 and an image processor 24. The memory controller 15 is communicatably connected to a display memory 16. The memory controller 15 is further connected to an LCD monitor 19 via a display processor 17 and a digital-to-analog (D/A) converter 18. The image processor 24 is connected to a frame buffer (frame memory) 25 including DRAM (dynamic random access memory) and the like.

A CPU (central processing unit) 21 is responsible for controlling a whole apparatus, and is communicatably connected to a ROM (read only memory) 22, a RAM (random access memory) 23, the image processor 24, an OSD (on-screen display) processor 26, an imaging condition detector 27, a camera drive controller 28, a range finder 29, and a touch panel 34 via a control bus 35.

Furthermore, the CPU 21 is connected to a memory card 31 via the control bus 35 and a memory interface (I/F) 30, and is connected to an operational input section 33 via the control bus 35 and an input I/F 32. In this configuration, the CPU 21, the ROM 22, and the RAM 23 form a controller 20.

In this configuration, the RAM 23 and the memory card 31 provide a storage capability, for example. The operational input section 33 provides a designation capability and a setting capability, for example. The image processor 24 provides an image processing capability, for example. The controller 20, more specifically the CPU 21, provides a control capability, for example.

In this configuration, the CPU 21 controls the components of the apparatus and reads out an image processing program from the ROM 22 to perform processing according to the program. The ROM 22 stores various fixed data in addition to the image processing program. In the processing, the RAM 23 serves as a work area.

An incident light from an object is imaged on the imaging device 12 through the imaging optical system 11. The camera drive controller 28 performs various drive controls such as exposure control, aperture control, focus control, zoom control, and shutter control. The imaging device 12 performs photoelectric conversion and provides an analog image signal to the image output section 13. The image output section 13 provides the analog image signal to the imaging condition detector 27. The imaging condition detector 27 detects the imaging condition including white balance for the analog image signal.

The image output section 13 further sends the analog image signal including a luminance signal and a color difference signal to the A/D converter 14. The A/D converter 14 converts the analog image signal to a digital image data and sends the image data to the memory controller 15. The memory controller 15 temporarily stores the image data in the display memory 16. The image data is read out through the memory controller 15 and sent to the display processor 17. The display processor 17 converts the image data to an RGB image data. The RGB image data is converted to an RGB analog image signal for liquid crystal driving by the D/A converter 18 and sent to the LCD monitor 19. Then the LCD monitor 19 displays alive image. The live image is referred to as through image.

With the live image displayed on the LCD monitor 19 in this way, when a shutter button, which is one element of the operational input section 33, is pressed, an imaging operation is performed.

Specifically, under the control by the controller 20, one frame of image data of the live image is captured into the frame buffer 25 through the image processor 24, compressed by the image processor 24, converted to an image file in a predetermined format, and recorded to the memory card 31 through the memory I/F 30. At the same time, information on the distance to the object measured by the range finder 29 including the imaging device (abbreviated to "distance information" hereinafter) is also recorded to the memory card 31 in a given format.

When the controller 20 reads out the image data and the distance information from the memory card 31, the compressed image data is decompressed by the image processor 24, stored in the frame buffer 25, and at the same time, written to the display memory 16 by the memory controller 15, read out from the display memory 16 to display the image on the LCD monitor 19.

In this state, when the user designates a desired point on the touch panel 34, the CPU 21 temporarily sets the point in the captured image as designated point. At this point, an object plane is temporarily set based on the set point. Furthermore, when a cross-shaped key, which is one element of the operational input section 33, is operated, the CPU 21 sets the tilt direction and tilt angle of the object plane based on that operation. In this way, on the image data stored in the frame memory 25, the CPU 21 of the controller 20 performs image processing using the image processor 24.

More specifically, under the control by the CPU 21, the image processor 24 performs image processing to blur pixels that are not on the object plane so that the same result can be obtained as a photograph taken with a film camera in which focus is achieved on shallow depth of field and the rest is blurred. The image data on which this blurring was performed is sent to the display processor 17 through the memory controller 15 to display the processed image on the LCD monitor 19. The processed image data is recorded to the memory card 31 through the memory I/F 30.

For blurring, the image processor 24 can also control the blur amount depending on the distance from the object plane. By this control, the blur amount can be gradually changed depending on the distance between the object plane and pixels. For example, increasing the blur amount as the distance between the object plane and the other pixels increases can provide blurring effect similar to that of the imaging optical system. Specifically, this can provide an effect such that the object plane is focused and the blur amount increases (and the image becomes increasingly blurred) as the distance from the object plane increases. In this example, the blur amount is controlled based on the relation of the distance between the object plane and the other pixels. However, similar control may be performed for each given region including two or more pixels, rather than for each pixel.

Next, a characteristic process performed by the image processing apparatus in accordance with the first embodiment of the invention to provide a correction equal to camera movement effect is described in detail below with reference to flowcharts shown in FIGS. 4 to 6.

The process described below also corresponds to the image processing method in accordance with the first embodiment.

Figure 4:
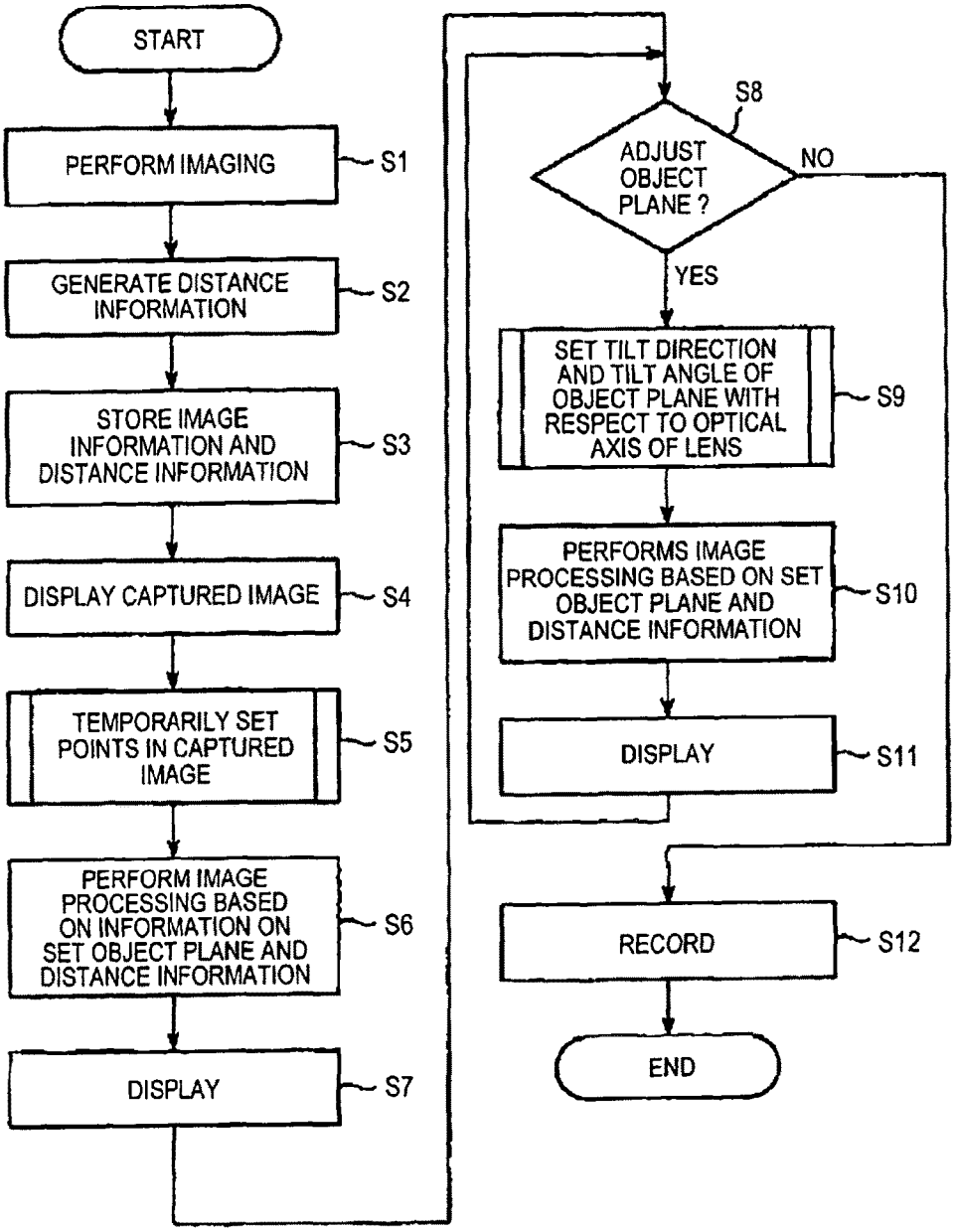
FIG. 4 is a flowchart describing in detail a characteristic process performed by the image processing apparatus in accordance with the first embodiment of the invention to provide a correction equal to camera movement effect.
Figure 5:
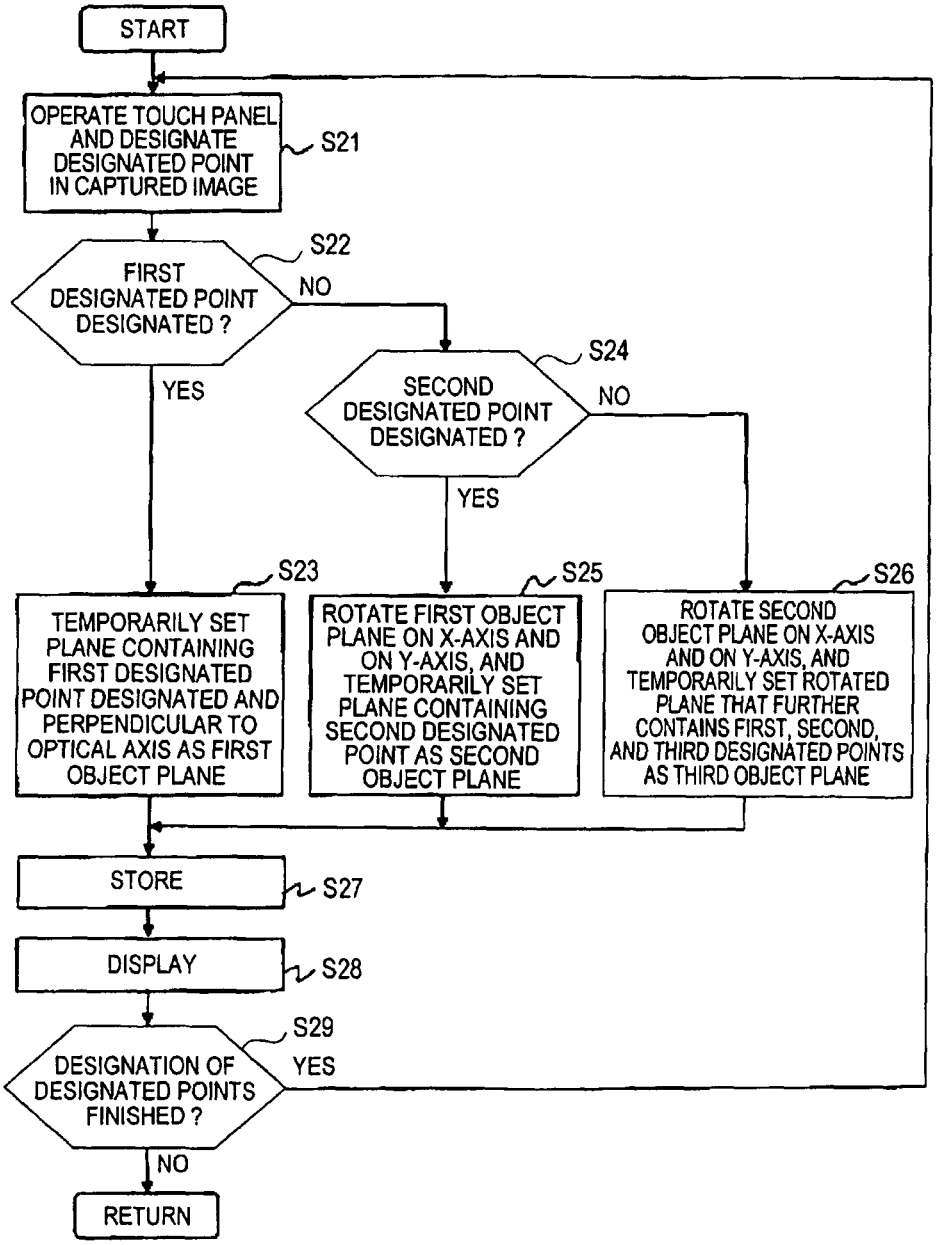
FIG. 5 is a flowchart describing the temporary setting of the object plane.

Starting the process shown in FIG. 4, the CPU 21 of the controller 20 performs imaging (step S1), generates distance information (step S2), and records image data and the distance information to the memory card 31 (step S3). Of course, performing imaging and generating distance information may be performed in any order or at the same time. The recording destination is not limited to the memory card 31.

Specifically, through the above steps, under the control by the CPU 21 of the controller 20, image data is captured into the frame memory 25 through the image processor 24, compressed by the image processor 24, converted to an image file in a predetermined format, and recorded to the memory card 31 through the memory I/F 30. At the same time, distance information measured by the range finder 29 is also recorded to the memory card 31 in a given format.

In this example, imaging is performed by one imaging device 12, and distance information is generated by an imaging device (not shown) that is a component of the range finder 29. However, instead of using these two imaging devices, one imaging device 12 may be shared for performing imaging and generating distance information. Of course, performing imaging and generating distance information may be parallel processing or serial processing.

Methods for obtaining distance information include TOF method and depth from defocus method. "TOF" method is a technique for determining the distance to an object by measuring propagation delay time of a light during which the light is emitted from a light emitting device included in the range finder 29, is reflected by the object, and returns. "Depth from defocus" method is a technique for determining distance based on the result of analyzing blur amount in an image. When two imaging devices are used, the blur amount for imaging and the blur amount for ranging can be separately optimized by changing at least one of characteristic, size, and aperture condition between the imaging devices. When only one imaging device 12 is used, the blur amount for imaging and the blur amount for ranging can be optimized by changing, for example, aperture condition for between imaging and ranging. However, the means are not limited to these.

The captured image thus recorded is displayed on the LCD monitor 19 (step S4).

Figure 7:
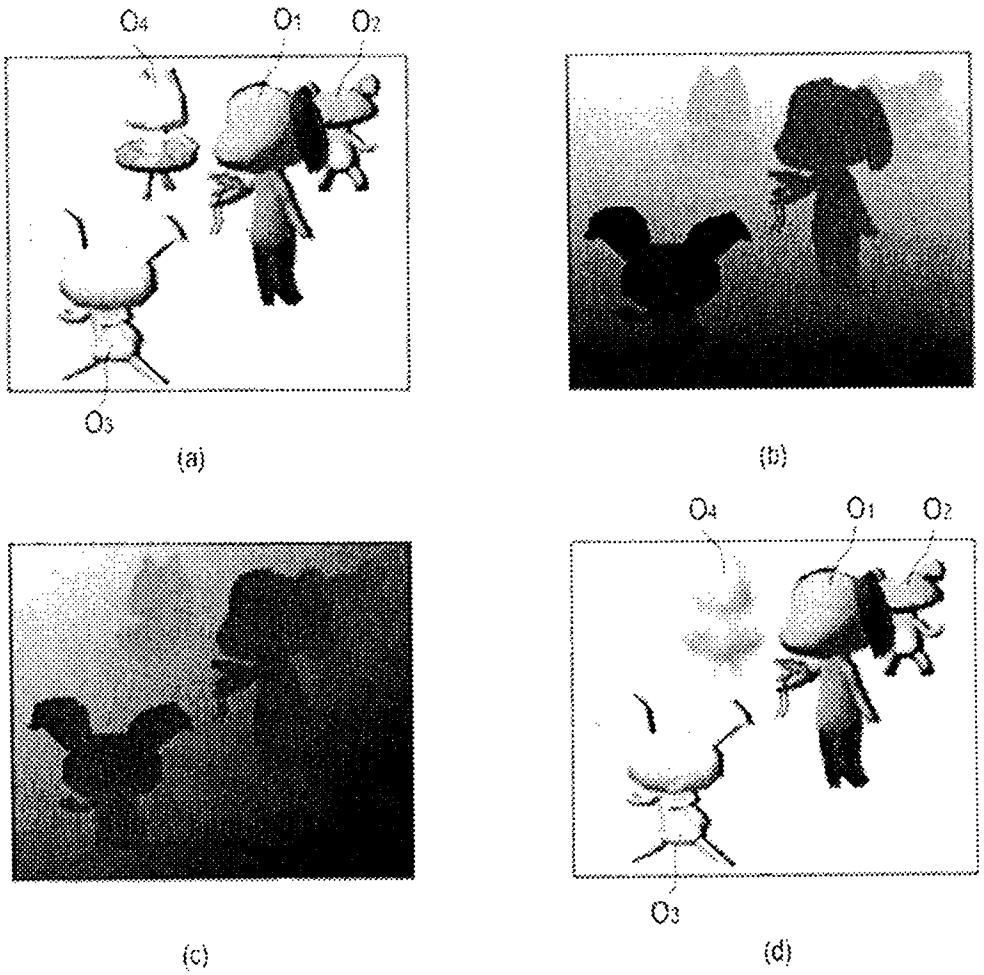
FIG. 7(a) shows an example of displaying a captured image.
FIG. 7(b) shows an example of displaying a depth map (distance information).
FIG. 7(c) shows an example of converting the depth map to the information on the distance from the object plane.
FIG. 7(d) shows an example of displaying a blurred image.

One example of the display is as shown in FIG. 7(a). In this example, objects $O_1$ to $O_4$ are shown. The distance information for the captured image is as shown in FIG. 7(b). This figure shows that low-key objects are in near field and high-key objects are in far field. In this example, the distance information is what is called depth map data, which is the individual distance data for one or more points in the captured image. The distance data for each pixel can be obtained at the maximum.

Then a designated point is temporarily set in the captured image (step S5). The detail of the process in this subroutine is, for example, as shown in the flowchart of FIG. 5.

Specifically, when a user designates an desired designated point in the captured image by operating the touch panel 34 (step S21), the CPU 21 determines whether it is a first designated point or not (step S22). If the CPU 21 determines that the designated point that has just been designated is the first one (Yes in step S22), the CPU 21 temporarily sets a plane containing the first designated point designated and perpendicular to the optical axis as a first object plane (step S23), stores information related to the first object plane (coordinates of the first designated point) in the RAM 23 (step S27), and displays the first designated point designated, on the captured image displayed on the LCD monitor 19 (step S28).

Then the CPU 21 determines whether or not the user has requested by operating the operational input section 33 and the like to finish designating designated points (step S29). If the CPU 21 determines that another designated point will be designated without finishing (Yes in step S29), the process returns to step S21 to repeat the above-described steps. If the CPU 21 determines that the designation of designated points should be finished (No in step S29), the process ends and returns.

On the other hand, in step S22, if the CPU 21 determines that the designated point that has just been designated is not the first one (No in step S22), the CPU 21 determines whether that designated point is a second one or not (step 24).

If the CPU 21 determines that the designated point that has just been designated is the second one (Yes in step S24), the CPU 21 performs conversion of the first object plane by rotating the first object plane on the X-axis and on the Y-axis, and temporarily sets the converted plane that further contains the second designated point as a second object plane (step S25). Then the CPU 21 stores information on the second object plane (coordinates, tilt angle, and tilt direction of the first and second designated points) in the RAM 23 (step S27), and displays the first and second designated points designated, on the captured image displayed on the LCD monitor 19 (step S28). However, only two points are not sufficient information for temporarily setting the object plane, because two or more planes may contain the line connecting the two points. Then the CPU 21 may temporarily rotate the first object plane on the Y-axis (or the X-axis) and set the rotated plane containing the second designated point as a second object plane.

Then, again, the CPU 21 determines whether or not the user has requested by operating the touch panel 34 and the like to designate another designated point (step S29). If the CPU 21 determines that another designated point will be designated (Yes in step S29), the process returns to step S21 to repeat the above-described steps. If the CPU 21 determines that another designated point will not be designated (No in step S29), the process ends and returns.

On the other hand, in step S24, if the CPU 21 determines that the designated point that has just been designated is not the second one (No in step S24), the CPU 21 determines that the designated point is a third one. Then the CPU 21 rotates the second object plane on the X-axis and on the Y-axis, and temporarily sets the rotated plane that further contains the first to third designated points as a third object plane (step S26). Furthermore, the CPU 21 stores information on the third object plane (coordinates, tilt angle, and tilt direction of the first to third designated points) in the RAM 23 (step S27), and displays the first to third designated points designated as the above, on the captured image displayed on the LCD monitor 19 (step S28).

Then, again, the CPU 21 determines whether or not the user has requested by operating the touch panel 34 and the like to designate another designated point (step S29). In this example, with the assumption that the number of designated points that can be designated is limited to up to three, designation of another designated point is not allowed (No in step S29), and the process returns to the main routine (from step S6 of FIG. 4). This limitation of up to three designated points is only for convenience of description of the example. However, an extension for designating four or more designated points is possible, of course.

When the first to third designated points are designated through the above-described process, the conversion of distance information of the object plane determined by those designated points is performed. For example, when three designated points are designated, the distance information is converted to depth map data related to the distance information of the three designated points as shown in FIG. 7(c).

Returning to FIG. 4, the CPU 21 performs the conversion of the distance data of each point of the image data based on the information, e.g., the coordinates, tilt angle, and tilt direction, of the set object plane (any of the first to third object planes), and performs an image processing using the image processor 24 based on the converted distance data (step S6). Specifically, for example, blurring is performed on points on the object plane so as to obtain an image that is given an effect equal to that of "imaging with such a shallow depth of field and tilted object plane" that imaging may not be performed with an actual imaging device 12 or focal length. Then the CPU 21 displays the blurred image on the LCD monitor 19 (step S7).

Now, the conversion of the distance data based on the setting of the object plane is described with reference to FIG. 8.

Figure 8:
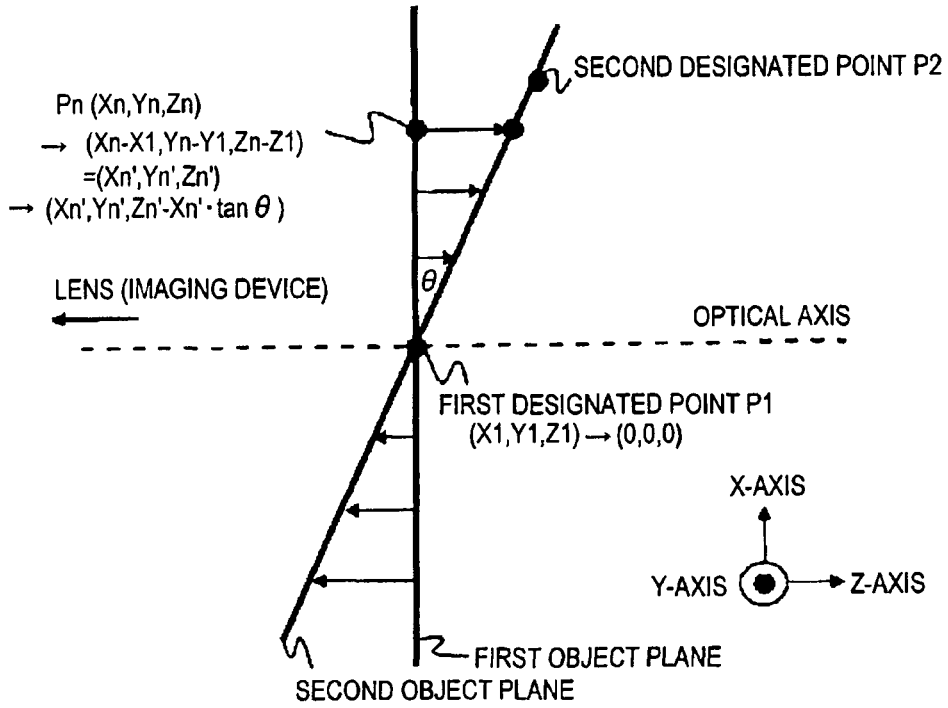
FIG. 8 is a conceptual drawing describing the conversion of the distance information performed along with changing the object plane.

In FIG. 8, the direction of the X-axis is perpendicular to the optical axis. When a first designated point $P_1$ is designated, a plain containing the first designated point $P_1$ and perpendicular to the optical axis are set as a first object plane. With this setting, the first designated point $P_1$ becomes the center of a new coordinate system, with the coordinates converted from $(X_1, Y_1, Z_1)$ to (0, 0, 0). Along with this coordinate system conversion, the coordinates of a point $P_n$ on the first object plane is converted, for example, from $(X_n, Y_n, Z_n)$ to $(X_n\text{-}X_1, Y_n\text{-}Y_1, Z_n\text{-}Z_1)$. This converted coordinates are represented as $(X_n', Y_n', Z_n')$.

When a second designated point $P_2$ is additionally designated, a second object plane containing the first designated point $P_1$ and the second designated point $P_2$ is set. The first designated point $P_1$ is still the center of another new coordinate system, with the coordinates of (0, 0, 0). The tilt angle of the second object plane with respect to the first object plane is θ. Assuming that the tilt direction is the Z-axis (positive) direction, for example, the point $P_n$ on the first object plane is projectively transformed to information on the distance from the second object plane with the Z-coordinate converted to $Z_n'-X_n'\cdot\tan\theta$. This is the distance information on the point $P_n$ after conversion. Here, for convenience of description, the conversion of the point $P_n$ on the first object plane is described. However, similar conversion of distance information is performed on every point (for example, pixel by pixel). The same applies to the first object plane rotated on the Y-axis with the tilt angle of θ.

Additionally, when a third designated point is designated and a third object plane is set (not shown in FIG. 8), the distance information is converted additionally based on the tilt angle and tilt direction thereof. Assuming that the third object plane is tilted with respect to the first object plane with the tilt angle of α on the X-axis, the Z-coordinate of the point $P_n$ mentioned above is $Z_n'-X_n'\cdot\tan\theta-Y_n'\cdot\tan\alpha$. This is the distance information on the point $P_n$ with the respect to the third object plane. The same applies to the first object plane rotated on the Y-axis with the tilt angle of θ and additionally rotated on the X-axis with the tilt angle of α.

Specifically, for example, when the first to third designated points are designated on the objects $O_1$ to $O_3$, respectively, or when the first designated point is designated, and through a rotation of the object plane on the X- and/or Y-axis, the objects $O_1$ to $O_3$ are set to be on the object plane, blurring is performed according to the distance from the object plane, as shown in FIG. 7(d). In other words, the image data is blurred with the blur amount according to the converted distance information. More specifically, the image data is blurred such that the blur amount increases as the distance from the object plane increases. Thus, in the example shown in FIG. 7(d), the object $O_4$ farthest from the object plane is most blurred. It should be noted that the image data may be blurred so that points within a predetermined distance from the object plane will be blurred with the same blur amount. In this way, depth of field can be considered along with blurring.

Next, the CPU 21 determines whether or not the user has requested by operating the touch panel 34 and the like to adjust the object plane (step S8). If the CPU 21 determines that the adjustment is not to be performed (No in step S8), the image data of the image blurred as described above is recorded to the memory card 31 (step S12) and the whole process ends. In step S12, the image data before being blurred may also be recorded to the memory card 31. It is recommended that this data should be managed with a different number by incrementing the last number. On the other hand, the CPU 21 determines that the adjustment is to be performed (Yes in step S8), the tilt direction and tilt angle of the object plane with respect to the optical axis of the lens is set.

Figure 6:
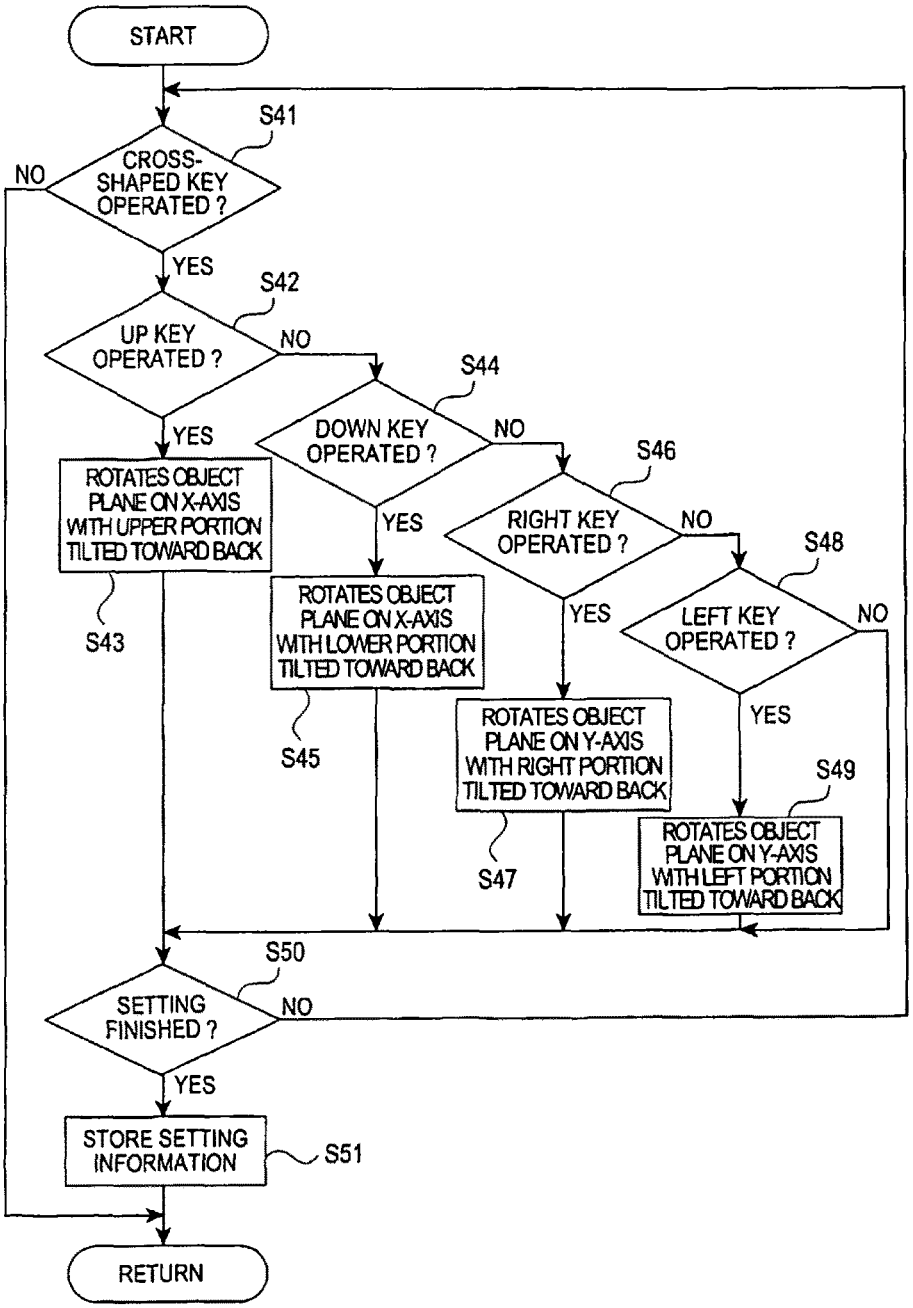
FIG. 6 is a flowchart describing the adjustment of the object plane.

The detail of the setting is as shown in the flowchart of FIG. 6.

Specifically, jumping to the process shown in FIG. 6, first, the CPU 21 determines whether or not a cross-shaped key, which is one element of the operational input section 33, has been operated (step S41). If the CPU 21 determines that it has not been operated (No in step S41), the process ends and returns.

On the other hand, if the CPU 21 determines that the cross-shaped key has been operated, then the CPU 21 determines whether the operated key is the Up key or not (step S42). If the CPU 21 determines that the operated key is the Up key (Yes in step S42), the CPU 21 rotates the object plane on the X-axis with the upper portion tilted toward the back and proceeds to step S50 (step 43).

On the other hand, if the CPU 21 determines that the operated key is not the Up key (No in step S42), then the CPU 21 determines whether the operated key is the Down key or not (step S44). If the CPU 21 determines that the operated key is the Down key (Yes in step S44), the CPU 21 rotates the object plane on the X-axis with the lower portion tilted toward the back and proceeds to step S50 (step 45).

On the other hand, if the CPU 21 determines that the operated key is not the Down key (No in step S44), then the CPU 21 determines whether the operated key is the Right key or not (step S46). If the CPU 21 determines that the operated key is the Right key (Yes in step S46), the CPU 21 rotates the object plane on the Y-axis with the right portion tilted toward the back and proceeds to step S50 (step S47).

On the other hand, if the CPU 21 determines that the operated key is not the Right key (No in step S46), then the CPU 21 determines whether the operated key is the Left key or not (step S48). If the CPU 21 determines that the operated key is the Left key (Yes in step S48), the CPU 21 rotates the object plane on the X-axis with the left portion tilted toward the back and proceeds to step S50 (step S49).

Then if the CPU 21 determines that the operated key is not the Left key (No in step S48), the CPU 21 determines that the operation has been wrong and proceeds to step S50.

Then the CPU 21 determines whether the setting is to be ended or not, according to the operational input using the enter key, which is one element of the operational input section 33 (step S50). If the CPU 21 determines that the setting is not to be ended, the process returns to step S41 to repeat the above-described steps. On the other hand, if the CPU 21 determines that the setting is to be ended, the CPU 21 stores the setting information on the set object plane in the RAM 23 (step S51), and the process returns to the main routine (from step S10 of FIG. 4).

The above-described process shown in FIG. 6 allows the object plane to be adjusted to a desired tilt direction and tilt angle by rotating the object plane on the X-axis or Y-axis based on the operation of the cross-shaped key (Up, Down, Left, and Right keys). For example, incremental/decremental adjustment for stepwise changing tilt angle by a predetermined angle for each operation of the cross-shaped key is also possible. This allows for precise adjustment in order to put an intended point on the object plane, or in order to obtain an image that is given an effect equal to that of imaging with as shallow depth of field as that of camera movement effect for an intended point.

Returning to FIG. 4, the CPU 21 performs image processing based on the set object plane and the distance information (step S10), and displays the image on which the image processing was performed on the LCD monitor 19 (step S11). The detail of the process in steps S10 and S11 is similar to that of steps S6 and S7 as already described. So the description is not repeated here.

In this way, the process returns to step S8, and the CPU 21 determines whether the adjustment of the object plane is to be performed again or not. If the CPU 21 determines that the adjustment is to be performed again, the CPU 21 repeats the process from step S9. If the CPU 21 determines that the adjustment is not to be performed again (No in step S8), the image data of the image blurred as described above is recorded to the memory card 31 (step S12) and the whole process ends.

Figure 9:
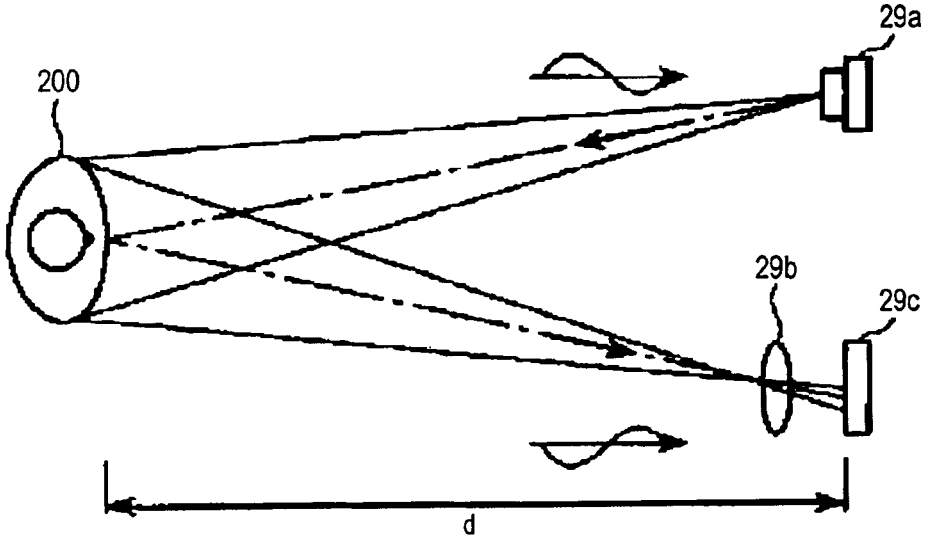
FIG. 9 is a conceptual drawing describing the basic principle of obtaining the distance information.

Now, as a method for obtaining distance information, TOF method is described in more detail with reference to a conceptual drawing shown in FIG. 9. As shown in FIG. 9, the range finder 29 includes a light emitting device 29a, an imaging lens 29b, and an imaging device 29c. With this configuration, a light with a certain wavelength modulated is emitted from the light emitting device 29a and irradiated to an object 200. The light reflected by the object 200 is received by the imaging device 20c through the imaging lens 29b. Then, by determining "delay time" for each pixel of the imaging device 20c from the phase difference between the irradiated light and the reflected light, the distance d to the object, which is distance information, is obtained based on the delay time. For example, this distance information may be found by dividing the product of light speed and the delay time by 2. Through the above-described process, the embodiment can provide distance information for each pixel at the maximum. In order to obtain distance information, phase difference analysis may also be used.

As described above, according to the first embodiment of the invention, an image given an effect corresponding to "camera movement (swing, tilt)" can be obtained with simple operation by obtaining distance information corresponding to an image imaged through an imaging optical system, designating a point in the captured image to set an object plane, and performing image processing based on the distance information and information on the object plane.

Of course, this capability can be implemented in an imaging apparatus such as a low-cost and compact digital still camera.

Specifically, according to an embodiment of the invention, an image given the effect corresponding to "camera movement (swing, tilt)" can be easily obtained, thus, for example, eliminating the need for a complicated mechanism for enabling optical camera movement such as swing and tilt (a mechanism design according to what is called "Scheimpflug principle"), and eliminating the need for an optical design specialized for "camera movement (swing, tilt)". Then a low-cost and compact image processing apparatus and image processing method can be provided.

Figure 10:
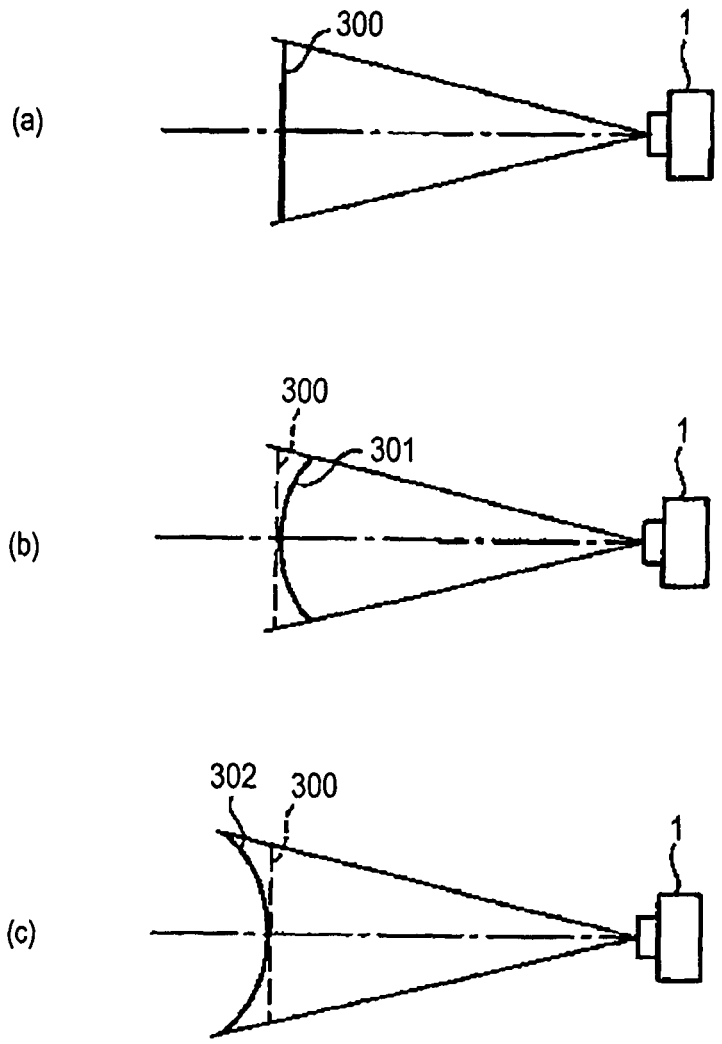
FIGS. 10(a) to (c) are conceptual drawings describing an example of setting the object plane to any curved surface.

It should be noted that a generated object plane may be not only a plane, but may be any curved surface (e.g., variable field curvature). Specifically, for example, when a plane perpendicular to the optical axis is set as an object plane as shown in FIG. 10(a), then a curved surface formed by bending the left and right portions of the object plane toward an image synthesizer with a predetermined curvature can be set as an object plane as shown in FIG. 10(b), or a curved surface formed by bending the left and right portions of the object plane toward opposite side of the image synthesizer with a predetermined curvature can be set as an object plane as shown in FIG. 10(c). Of course, though not shown, a curved surface formed by bending the upper and lower portions of the object plane toward the image synthesizer (or toward opposite side of the image synthesizer) with a predetermined curvature can be set as an object plane. Also, an image plane can be in mortar-shape. This will be discussed in detail in a ninth embodiment of the invention.

Figure 11:
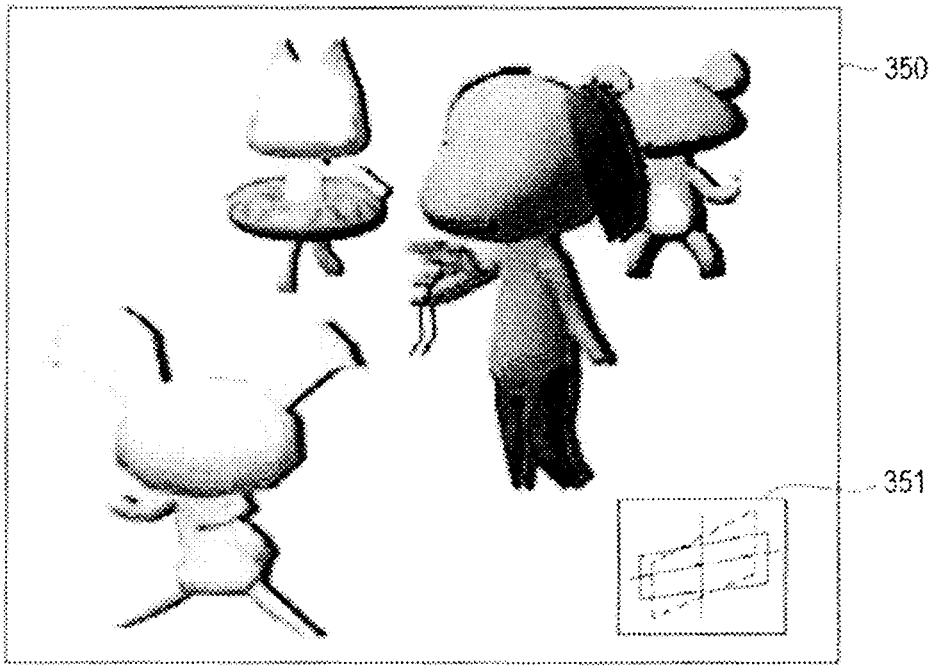
FIG. 11 shows an example of displaying with a window for showing the object plane.

Furthermore, as shown in FIG. 11, how the object plane is being adjusted using a cross-shaped key, which is one element of the operational input section 33, may be displayed on a window 351 located at the lower-right of a screen 350 of the LCD monitor 19. This will be discussed in detail in an eighth embodiment of the invention.

(Second Embodiment)

Next, a second embodiment of the invention is described.

The second embodiment of the invention implements the setting of an object plane and blurring using an image processing apparatus as described previously with an information processing apparatus such as a computer and accessory hardware.

Figure 12:
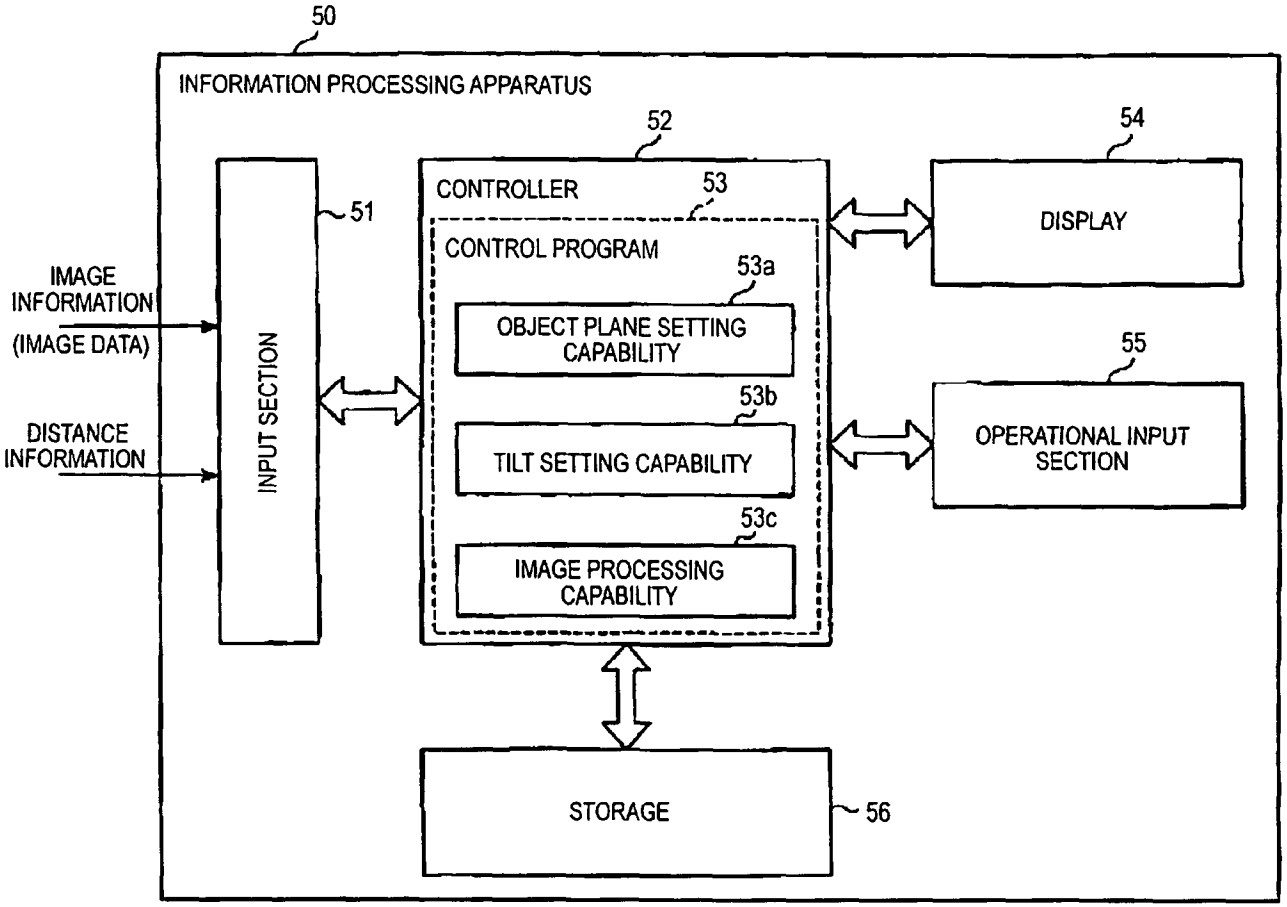
FIG. 12 shows a configuration of an information processing apparatus in accordance with a second embodiment of the invention.

FIG. 12 shows an example of configuration of an information processing apparatus in accordance with the second embodiment.

As shown in FIG. 12, an information processing apparatus 50 includes an input section 51, a controller 52 for controlling a whole system based on a control program 53, a display 54, an operational input section 55, and a storage 56. Based on the control program 53, the controller 52 controls, for example, an object plane setting capability 53a, a tilt setting capability 53b, and an image processing capability 53c. This control program corresponds to, for example, an image processing program.

In this configuration, when image data and distance information is input from the input section 51, the controller 52 reads out the control program 53 stored in the storage 56 and performs processing based on the control program 53. Specifically, the controller 52 displays an image based on the image data on the display 54, and prompts a user to set an object plane by operating the operational input section 55.

When the user selects a desired point (or region) in the displayed image by operating the operational input section 55, the controller 52 sets an object plane based on the object plane setting capability 53a. Then the controller 52 sets the tilt direction and tilt angle of the object plane based on a further operation of the operational input section 55. Then the controller 52 performs image processing such as blurring based on the information on the finally set object plane and distance information, and displays the processed image on the display 54. The detail of the setting of the above example is similar to that of the first embodiment (see the flowcharts shown in FIGS. 4 to 6). So the description is not repeated here.

As described above, according to the second embodiment of the invention, an image given the effect corresponding to "camera movement (swing, tilt)" can be obtained with simple operation by prompting the user to set an object plane based on the input image data and distance information and performing an image processing based on the information on the object plane and the distance information.

In other words, the second embodiment of the invention can provide an image processing program for easily obtaining an image given the effect corresponding to "camera movement (swing, tilt)". Also, by implementing this image processing program, an image given such an effect can be obtained easily and at a low cost using an information processing apparatus such as a computer.

In the above, the first and second embodiments of the invention has been described. However, of course, the invention is not limited to those embodiments, but various improvements or modifications may be made without departing from the spirit of the invention.

For example, in the above-described first and second embodiments, up to three desired point are designated using the touch panel while looking at the screen and an object plane is set based on the point. However the invention is not limited to these examples. The user may designate three points and also specify a depth of field (aperture) to adjust variation of blurring (using aperture priority provides an effect equal to that of imaging with such a shallow depth of field and tilted object plane that imaging may not be performed with an actual imaging device/focal length). The depth of field (aperture) may be fixed automatically. Furthermore, the user may designate four or more points and may calculate the depth of field so as to focus on all of the points or give some weight to each of the points. "Depth of field" means a range of distance within which focus is considered to be achieved around an object in focus.

The user may specify a focal length and aperture by 35 mm size conversion. Here, 35 mm size conversion means considering a lens of which angle of view is equal to that of 35 mm standard lens for each different imaging size as a standard lens. Or when four or more points are designated, an object plane can be determined based on ordinary solid analytic geometry. The same applies to the conversion of distance information based on information on an object plane. Of course, blurring algorithm is not limited to the above-described example.

The image processing is not limited to the above-described blurring, but includes various processing such as granulation, mosaic, changing texture, noise addition, changing luminance or chrominance, and stepwise gradation. Of course, an object plane may be a curved surface, such as spherical surface, cylindrical surface, conical surface, and higher-order approximated curved surface.

(Third Embodiment)

Next, a third embodiment of the invention is described.

Figure 13:
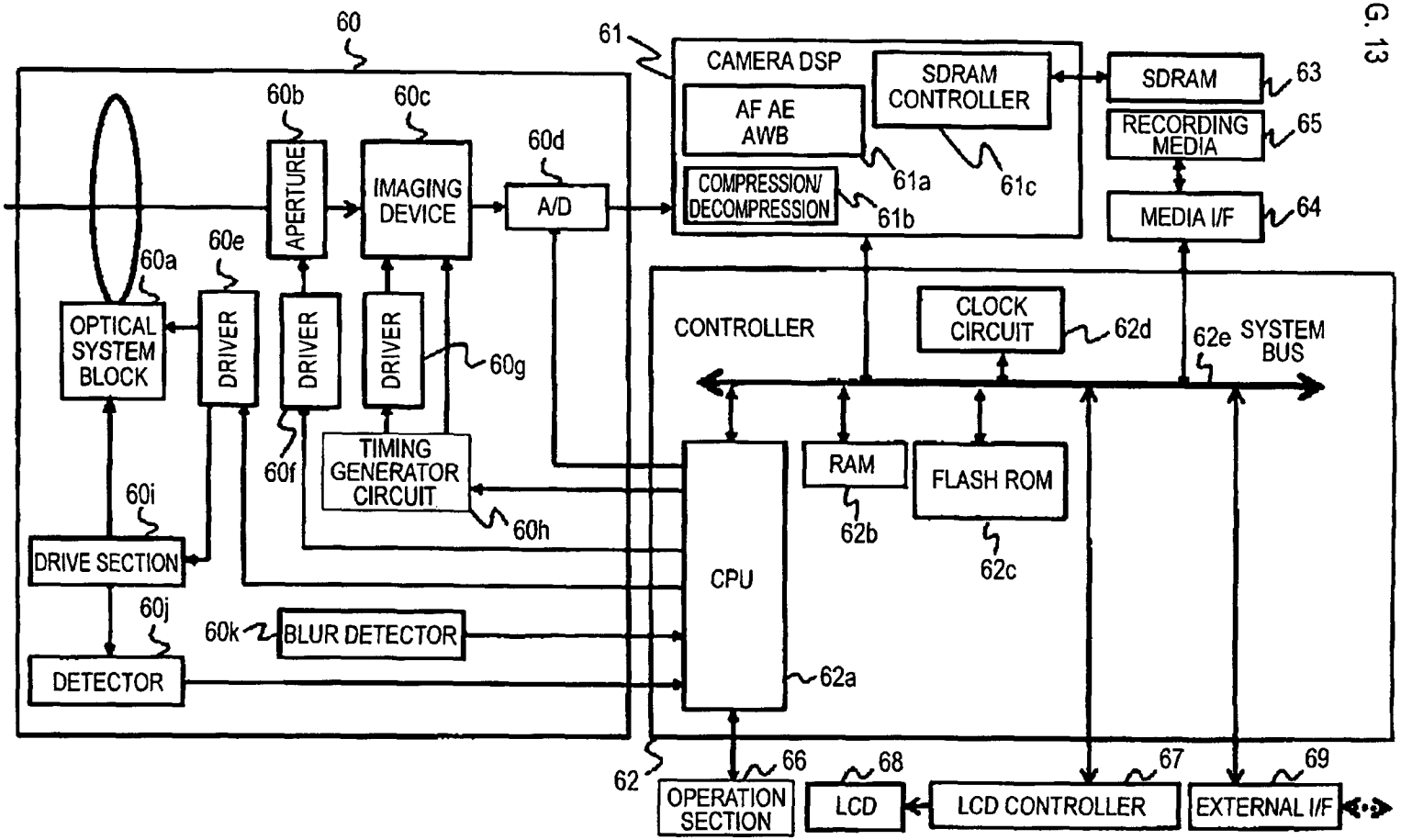
FIG. 13 shows a configuration of an image processing apparatus in accordance with a third embodiment of the invention.

FIG. 13 shows a configuration of an image processing apparatus in accordance with the third embodiment.

In this figure, the image processing apparatus in accordance with the third embodiment is exemplarily applied to an imaging apparatus such as a digital camera.

As shown in FIG. 13, the image processing apparatus includes a camera 60, a camera DSP (digital signal processor) 61, an SDRAM (synchronous dynamic random access memory) 63, a media I/F (media interface) 64, a controller 62, an operation section 66, an LCD (liquid crystal display) controller 67, an LCD 68, an external I/F (external interface) 69, and a recording media 65. The recording media 65 is detachable.

The recording media 65 may be what is called a memory card employing semiconductor memory, an optical recording media such as recordable DVD (digital versatile disk) and recordable CD (compact disc), a magnetic disk, and the like.

The camera 60 includes an optical system block 60a, an aperture 60b, an imaging device 60c such as CCD (charge coupled device), an A/D converter 60d, an optical block driver 60e, an aperture driver 60f, an imaging device driver 60g, a timing generator 60h, a drive section 60i, a detector 60j, and a blur detector 60k. The optical system block 60a includes a lens, a focusing mechanism, a shutter mechanism, an aperture (iris) mechanism, and a hand blur correction driver. For the lens in the optical system block 60a, a zoom lens is used.

The controller 62 is an microcomputer in which a CPU (central processing unit) 62a, a RAM (random access memory) 62b, a flash ROM (read only memory) 62c, a clock circuit 62d, and the like are connected via a system bus 62e, and is responsible for controlling components of the imaging apparatus in accordance with this embodiment.

The RAM 62b is mainly used as a work space, for example, for temporarily storing an intermediate result of processing. The flash ROM 62c stores, in advance, various programs to be executed by the CPU 62a and data to be used in processing. An image processing program may be stored in the flash ROM 62c. The clock circuit 62d can provide the current date, the current day of the week, and the current time of the day, and can also provide a shooting date and time.

In capturing an image, the optical block driver 60e generates a drive signal, in response to the control from the controller 62, for actuating the optical system block 60a and provides this signal to the optical system block 60a to actuate the optical system block 60a. In response to the drive signal from the optical block driver 60e, the optical system block 60a captures an image of an object and provides it to the imaging device 60c.

The imaging device 60c, which is responsible for performing photoelectric conversion on the image from the optical system block 60a, operates in response to the drive signal from the imaging device driver 60g and captures the image of the object from the optical system block 60a. Furthermore, based on a timing signal from the timing generator 60h controlled by the controller 62, the imaging device 60c provides an analog image data of the captured image of the object to the A/D converter 60d. The A/D converter 60d performs an A/D conversion and generates a digitized image data.

This digitized image data is provided to the camera DSP 61. The camera DSP 61 performs camera signal processing, such as AF (auto focus), AE (auto exposure), and AWB (auto white balance), on the provided image data. The image data on which various adjustments have been performed in this way is compressed with a predetermined compression scheme, provided to the recording media 65 through the system bus 62e and the media I/F 64, and then recorded to the recording media 65.

After the image data is recorded in the recording media 65, a desired image data is read out from the recording media 65 through the media I/F 64 in response to an operational input from the user accepted through the operation section 66 including a touch panel and control keys, and provided to the camera DSP 61.

The camera DSP 61 decompresses (expands) the compressed image data read out from the recording media 65 and provided through the media I/F 64, and provides the decompressed image data to the LCD controller 67 through the system bus 62e. The LCD controller 67 generates an image signal for the LCD 68 from the provided image data and provides the image signal to the LCD 68. This enables an image corresponding to the image data recorded in the recording media 65 to be displayed on the display screen of the LCD 68.

Also, image data provided through the external I/F 69 (for example, image data provided from an external personal computer connected with the external I/F 69) can be recorded to the recording media 65. The image data recorded in the recording media 65 can be provided to an external personal computer and the like through the external I/F 69.

Furthermore, with the external I/F 69 connected to a communication module to connect to a network such as the Internet, various image data and other information can be obtained through the network and recorded to the recording media 65. Or the data recorded in the recording media 65 can be sent to a destination through the network.

The external I/F 69 may be a wired interface such as IEEE (institute of electrical and electronics engineers) 1394 and USB (universal serial bus). Or the external I/F 69 may be a wireless interface using light or radiowave. Thus the external I/F 69 may be wired or wireless.

As described above, the image processing apparatus in accordance with the third embodiment is directed to provide a more simple imaging technique specifically corresponding to "camera movement (swing, tilt)", and provide this using an image processing and image correction controlled by the CPU 62a, and additionally allows intuitive operation as one feature.

Figure 14:
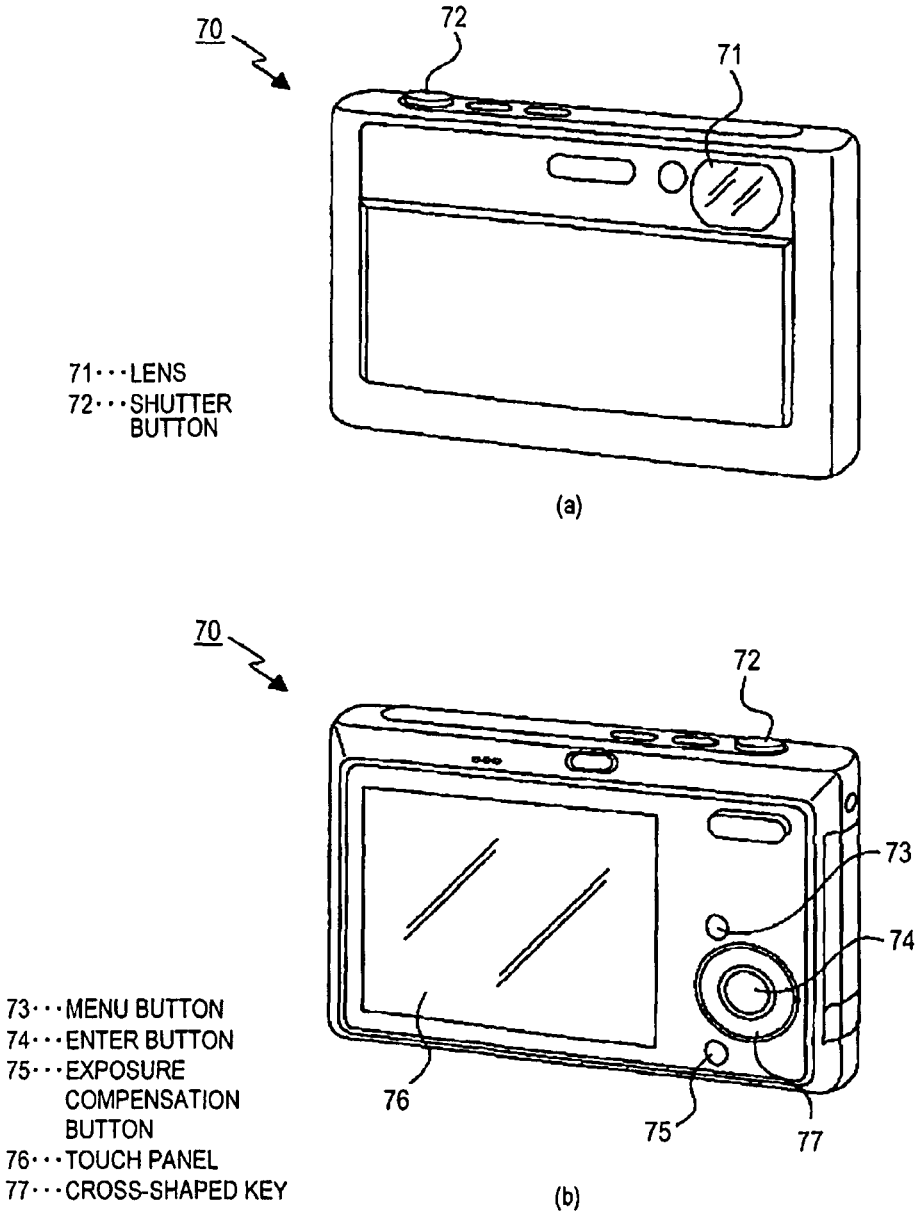
FIGS. 14(a) and (b) are perspective views of the image processing apparatus in accordance with the third embodiment.

FIG. 14 shows an appearance configuration of a digital camera as an imaging apparatus to which the image processing apparatus is applied. FIG. 14(a) is a front perspective view of the digital camera. FIG. 14(b) is a rear perspective view of the digital camera. As shown in these figures, a digital camera 70 includes a lens 71, a shutter button 72, a menu button 73, an enter button 74, an exposure compensation button 75, a touch panel 76, and a cross-shaped key 77. Designation of a point (described later) is performed by operating the touch panel 76 and the like.

Now, a characteristic process using the image processing apparatus in accordance with the third embodiment of the invention is described in detail with reference to a flowchart shown in FIG. 15. Some or all of the process described below also corresponds to the image processing method in accordance with the third embodiment of the invention.

Starting this process, the CPU 62a of the controller 62 performs imaging on the object using the imaging device 60c and generates a digital image data using the A/D converter 60d (step S101). Then the CPU 62a generates distance information (depth map) for the generated image data (step S102). The distance information (depth map) is distances to the object each related to each pixel of the image, and can be obtained using TOF (time of flight) method or depth from defocus method.

Then the CPU 62a records the image data and the distance information to the recording media 65 (step S103). In other words, the image data and the distance information are recorded to the recording media 65 through the media I/F 64 in association with each other. The distance information is maintained in the form of metadata. Storing the image data and the distance information associated with each other using a file number and the like to different locations may reduce the size of image files themselves. In this case, the association between them should be determined when using the image data and the distance information.

Then the CPU 62a controls the LCD controller 67 to display the image on the LCD 68 (step S104). Then the CPU 62a performs processing based on the manipulation of the object plane corresponding to "camera movement (swing, tilt)" (step S105). The detail of the process of step S105 is described later with reference to FIG. 16.

The object plane is a plane that intersects with the extended light-accepting surface of the imaging device 60c and the extended principal plane of the optical system and on which focus is achieved, conforming to what is called Scheimpflug principle. In the image processing apparatus accordance with this embodiment, imaging is performed with the optical axis of the lens (almost) perpendicular to the imaging device plane, so that what is called camera movement (swing, tilt) operation cannot be performed using the imaging device 60c and the optical system of the optical system block 60a. The manipulation of the object plane corresponding to "camera movement (swing, tilt)" is performed using image processing.

Then the CPU 62a reads out the image data recorded in step S103 and performs image processing (blurring according to the distance from the object plane) using the object plane set in step S105 (step S106). The detail of the process of step S106 is described later with reference to FIGS. 18 and 19. Then the CPU 62a records the image data on which the image processing has been performed to the recording media 65 through the media I/F 64 (step S107).

At this point, if the CPU 62a, when performing imaging, recorded image data for the displayed image to the recording media 65 as a different file than the original image data, the CPU 62a records at the same time image data for the displayed image on which the image processing has been performed. Then the process ends.

Figure 15:
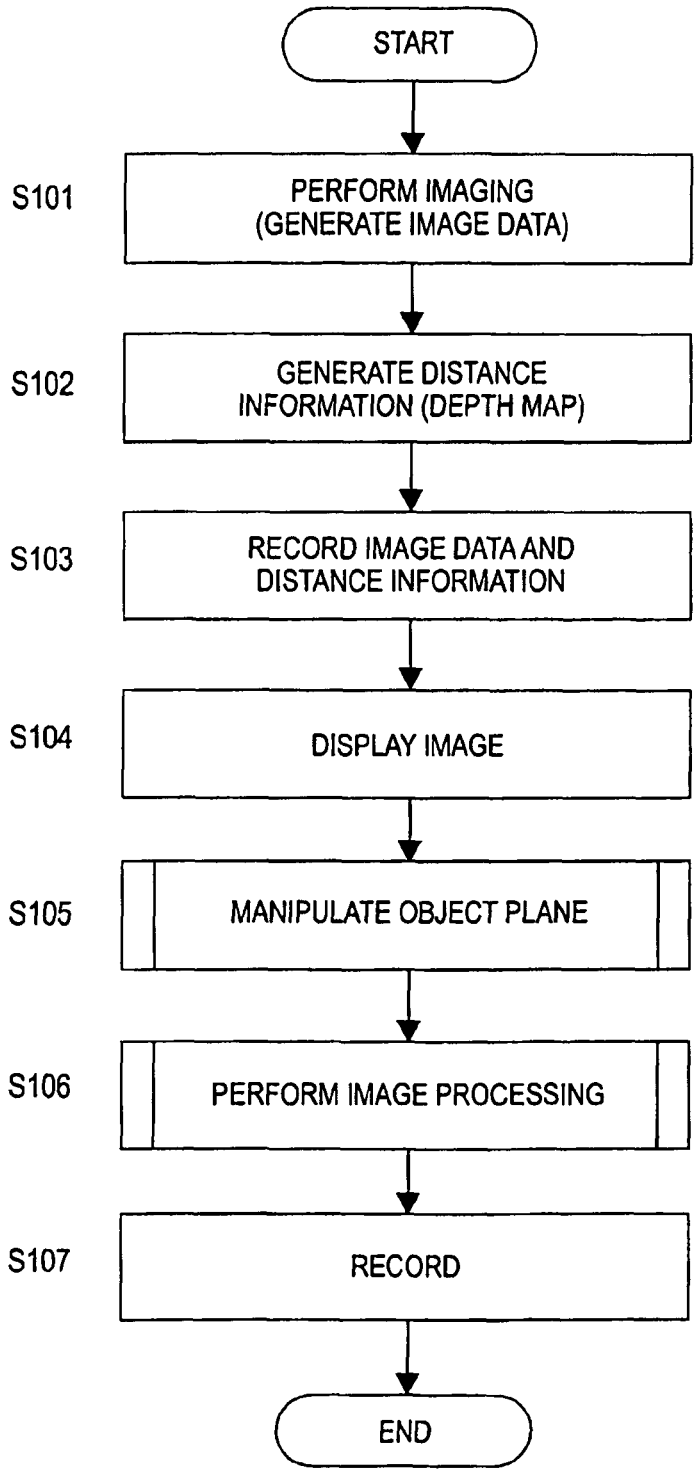
FIG. 15 is a flowchart describing in detail a characteristic process using the image processing apparatus in accordance with the third embodiment of the invention.

Next, the detail of the process of step S105 in FIG. 15 is described with reference to a flowchart shown in FIG. 16. In this process, the touch panel 76 is used for the manipulation of the object plane.

Entering this process, the CPU 62a accepts the designation of the center of the object plane by touching the touch panel 76 (step S201). Specifically, the CPU 62a detects the coordinates of a touched location and accepts the location as a designation of location. The center of the object plane is the rotation center of the object plane and is the three-dimensional and spatial center location on which the object plane rotates in a new coordinate system consisting of X-, Y-, and Z-axes.

Then the CPU 62a displays a point representing the rotation center of the object plane on the display screen of the LCD 68 to let the user know the rotation center of the object plane thus set (step S202). Then the CPU 62a performs coordinate conversion on the distance information (depth map) so that the rotation center of the object plane will be the center of the three-dimensional coordinate system (step S203).

The coordinates (X, Y, Z) of an image is defined by the two-dimensional coordinates (X, Y) and the depth coordinate (Z) of the image. The distance information (depth map) relates to the depth coordinate (Z) of the coordinates (X, Y, Z). The CPU 62a first performs conversion so that the coordinates (X, Y, Z) of the pixel set to the center of the object plane will be the origin (0, 0, 0) of the three-dimensional coordinate system. The coordinates of the other points (pixels) are converted to coordinates of a new coordinate system of which center is the coordinates of the center of the object plane. In this way, the distance information is converted to the distance from the object plane. The detail of this conversion of the distance information is as previously described with reference to FIG. 8. So the description is not repeated here.

In this embodiment, the shape of the object plane is assumed to be a simple plane. When the center of the object plane on the display is shifted from the user-intended position, the correction is made by dragging the displayed point. For example, the center point can be moved in the direction specified by using the cross-shaped key 77 shown in FIG. 14(b).

Then the CPU 62a determines whether the user has fixed the center of the object plane by operating the touch panel 76 (e.g. tapping the enter button) (step S204). When the center of the object plane has been corrected according to the user operation, the coordinates of the center changes. In this case, the process returns to step S203, and the coordinate conversion is performed again on the distance information (depth map) so that the corrected center of the object plane will be the center of the three-dimensional coordinate system. On the other hand, the center is fixed by, for example, tapping again the center of the object plane displayed on the LCD 68, the process proceeds to step S205.

If the CPU 62a determines that the center of the object plane is fixed by the user operation, the CPU 62a performs image processing on the displayed image and displays the image so that the effect will be seen when the object plane is manipulated (step S205). This displayed image is not the captured image data itself, but is an image written to the RAM 62b (or SDRAM 63) for displaying on the display screen (LCD 68) for the purpose of confirming the image itself or the effect of manipulating the object plane. This image processing may be a simplified processing because the purpose is only to confirm the image itself.

This displayed image may be downsized from the captured image data to an image matched with the resolution of the display screen (LCD 68) and temporarily stored in the RAM 62b (or SDRAM 63). Or, when imaging is performed, the displayed image may be stored in the recording media 65 through the media I/F 64 as a different file than the original image data.

Specifically, in step S205, blurring is performed according to the distance from the object plane in response to the distance from the object plane. The size of the displayed image may be smaller than that of the actually recorded image. It is desirable to reduce processing load and enable smooth user operation by displaying an image with a minimum size for the size and number of pixels of the display screen.

In this embodiment, it is assumed that only the object plane is manipulated with a fixed depth of field (however, shallower than that of actual imaging) for simple user operation.

Then the CPU 62a rotates the object plane according to the user operation (step S206). This rotation of the object plane is performed by rotating (or tilting) the object plane on the X- or Y-axis by tapping coordinates other than the center of the object plane.

Figure 17:
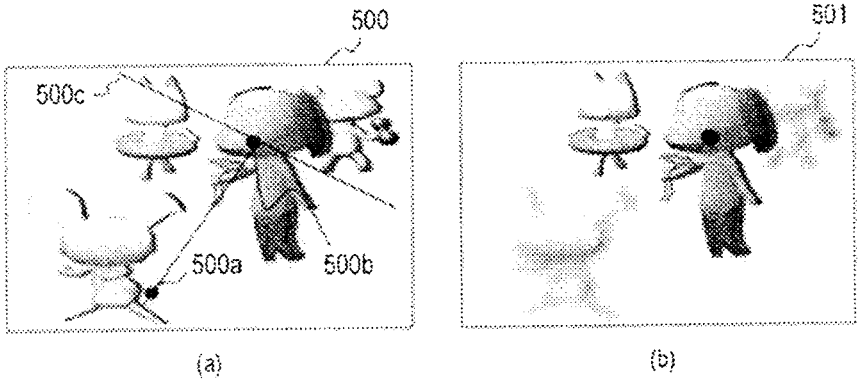
FIGS. 17(a) and (b) show an example of displaying for describing the manipulation of the object plane.

More specifically, as shown in FIG. 17(a), the direction of tilting the object plane is specified by a tap (touch) location 500a on a display screen 500, and the amount of tilting the object plane is specified by tapping intensity. In the display screen 500, the object plane is rotated on a rotation axis 500c that is perpendicular to the line connecting the coordinates (X, Y) of the tap location 500a and a rotation center 500b related to the designated point previously designated on the object plane, and passes through the rotation center 500b of the object plane. Tapping gives an intuitive feeling of hitting a plane.

The rotation of the object plane is performed by a coordinate conversion based on solid analytic geometry. For example, the distance from the object plane is calculated for each pixel. Specifically, according to the user operation of designating the rotation center of the object plane and rotating the object plane, the CPU 62a performs coordinate conversion from the distance information to the information on the distance from the object plane.

Then the CPU 62a performs image processing on the displayed image so that the effect of thus rotating the object plane on its rotation center 500b (or tilting the object plane) can be seen, and displays the displayed image on the LCD 68 (step S207). In other words, the CPU 62a performs blurring according to the distance from the rotated (tilted) object plane. The result is shown in FIG. 17(b).

As with the image processing in step S205 described above, the size of the displayed image on which the image processing in step S207 is performed may be minimum for both smooth user operation and confirming the effect of the operation. Even after tilting the object plane, the rotation center of the object plane may be corrected by dragging. This may be achieved by performing coordinate conversion as is with step S203 described above.

Then the CPU 62a determines whether or not the user has requested by, for example, tapping again the center of the object plane displayed on the touch panel 76 to finish rotating the object plane (step S208). If the CPU 62a determines that the user has not requested to finish rotating, the process returns to step S206 to repeat the above-described steps. On the other hand, if CPU 62a determines that the user has requested to finish rotating, the process ends and returns to the process shown in FIG. 15.

Figure 18:
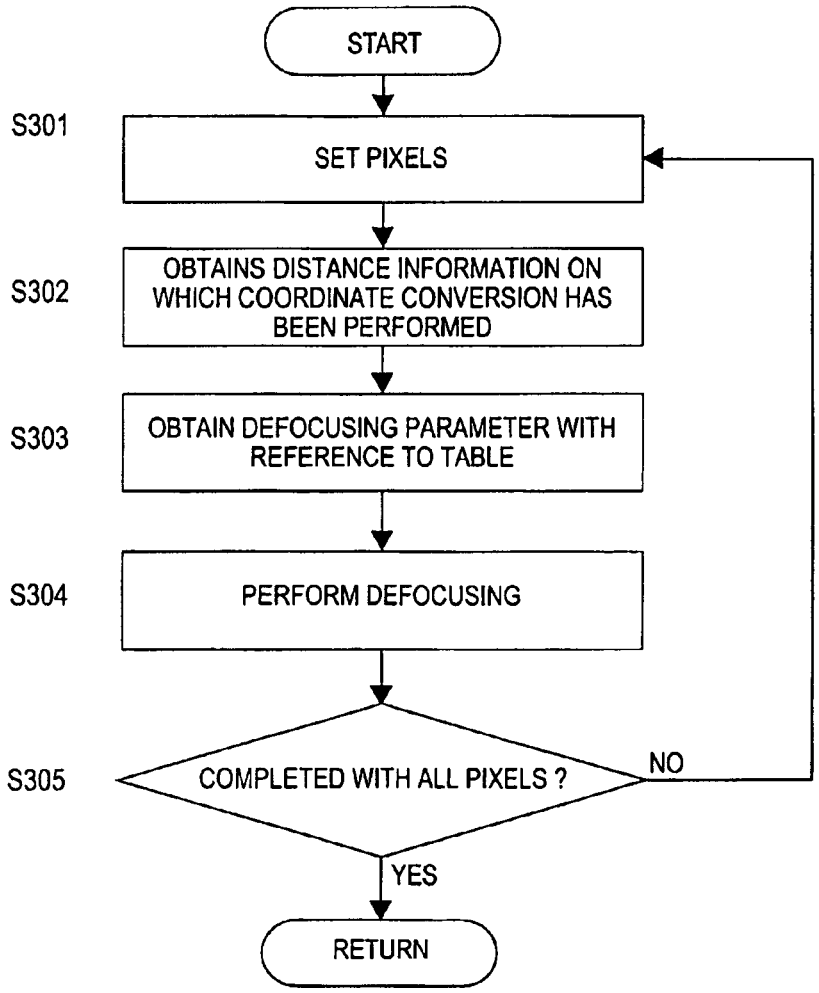
FIG. 18 is a flowchart describing in detail a process relating to the image processing.
Figure 19:
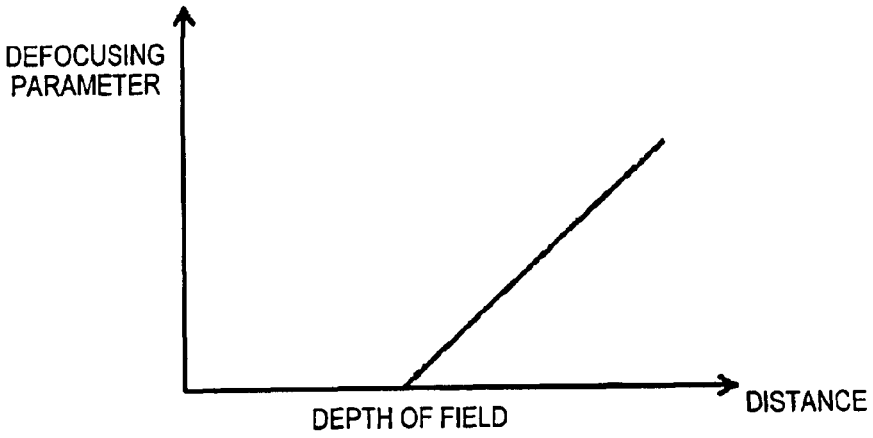
FIG. 19 shows a relation between the blurring parameter and the distance information.

Next, the detail of the process of step S106 in FIG. 15 is described with reference to a flowchart shown in FIG. 18. Here, it is assumed that the image processing apparatus has a table based on the relation as shown in FIG. 19 in the flash ROM 62c and the like. In FIG. 19, the vertical axis represents the value of the blurring parameter and the horizontal axis represents the distance information. The blurring parameter is zero when the distance is less than a depth of field. When the distance is equal to or more than the depth of field, the blurring parameter is, for example, a linear function of the distance (that is, the blurring parameter increases as the distance increases). It is preferred that some blurring parameters are held according to the distance to the object and the blurring parameter is not limited to a linear function, but may be added a parameter based on the result of an optical calculation.

Starting the process, the CPU 62a sets pixels on which image processing is to be performed (step S301). Then the CPU 62a obtains the distance information on which coordinate conversion to the distance from the object plane has been performed (step S302). Then the CPU 62a obtains the blurring parameter corresponding to the distance information with reference to the table based on the relation shown in FIG. 19 (step S303). Then the CPU 62a adds the blurring parameter to the pixels (step S304). For example, blurring can be performed by low-pass filtering (LPF processing) using adjacent pixels, in which the blur amount can be changed by changing the number of the adjacent pixels. With the average of all values of pixels to be used equal to the value of a target value, the blur amount increases as the amount of pixels increases.

Then the CPU 62a determines whether or not the processing has been completed with all of the pixels (step S305). If the CPU 62a determines that the processing has been completed with not all of the pixels, the process returns to step S301 to repeat the above-described steps. On the other hand, if the CPU 62a determines that the processing has been completed with all of the pixels, the process ends and returns to the process shown in FIG. 15.

The basic process of performing imaging, setting the center of the object plane, manipulating the object plane, and performing the image processing has been described. In any of these steps, an operation can be undone by selecting "Cancel" or "Back".

Figure 20:
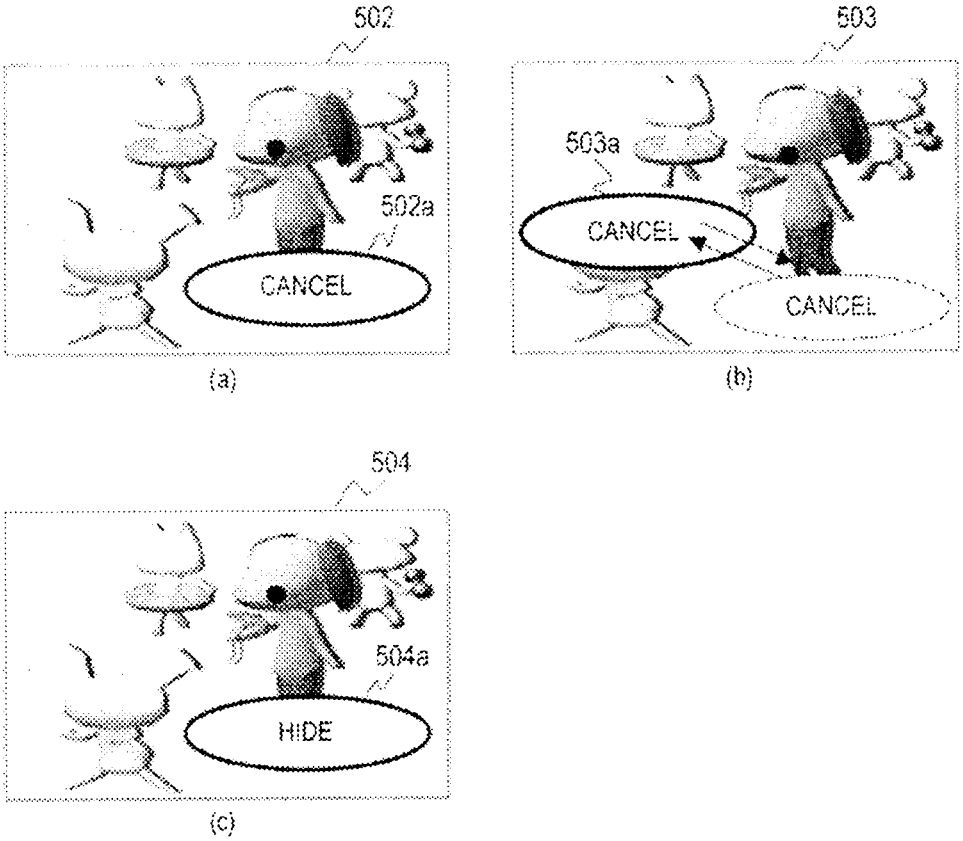
FIGS. 20(a) to (c) show examples of displaying images relating to undoing.

Specifically, as shown in FIG. 20(a), "Cancel" or "Back" is superimposed as an operation button 502a on a display screen 502. The button 502a should be placed so as not to hide the center of the object plane. Also the button 502a is preferably placed so as not to interfere with the correction by dragging the rotation center of the object plane.

Also, as shown in FIG. 20(b), an operation button 503a such as "Cancel" or "Back" can be moved by dragging on a display screen 503. This prevents the button 503a from interfering with the correction of the rotation center of the object plane. Also, the confirmation of the effect of tilting the object plane can be achieved completely in every corner by moving the button.

Furthermore, the confirmation of the effect corresponding to "camera movement (swing, tilt)" may require looking over every corner as well as around the center of the object plane at one time. In order to do this, as shown in FIG. 20(c), an operation button 504a such as "Hide" may be placed on a display screen 504. The "Hide" operation button 504a can also be moved by dragging as shown in FIG. 20(b).

Tapping the "Hide" operation button 504a causes all elements other than the display screen 504 to be hidden and allows looking over the screen at one time to confirm the effect of manipulating the object plane. Tapping anywhere on the display screen 504 again causes the hidden elements to be shown again. Operating the "Hide" operation button 504a from a menu allows selecting an element not to be hidden and displaying the element. For example, it is possible to only show the rotation center of the object plane and hide the rest.

(Fourth Embodiment)

Next, a fourth embodiment of the invention is described.

The configuration of an image processing apparatus in accordance with the fourth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

In order to obtain the effect corresponding to "camera movement (swing, tilt)," manipulating the depth of field from the object plane as well as tilting the object plane is desirably possible. In view of the above, in the image processing apparatus and the image processing method in accordance with the fourth embodiment, when fixing the rotation center of the object plane (corresponding to step S204 of FIG. 16), fixing the center of the object plane and fixing the depth of field can be achieved by tapping twice the rotation center of the displayed object plane.

Normally, the depth of field has the relation with the aperture as shown below.

When performing imaging with a bright aperture, the depth of field is shallow (the shutter speed is fast).

When performing imaging with a dark aperture, the depth of field is deep (the shutter speed is slow).

Then, the depth of field is fixed by the time interval of two taps. When the interval is short, the depth of field is set to be shallow. When the interval is long, the depth of field is set to be deep. This would be intuitive for a user who operates a camera, because this corresponds to the relation with how fast (or slow) the shutter speed is.

Desirably, the depth of field can be changed even after the rotation center of the object plane is fixed or the object plane is tilted. So, in the image processing apparatus and the image processing method in accordance with the fourth embodiment, the depth of field can be reset by tapping twice the rotation center of the object plane and image processing based on the reset depth of field (corresponding to step S207 of FIG. 16) can be performed as many times as needed until finishing the rotation of the object plane is requested (corresponding to step S208 of FIG. 16).

Figure 21:
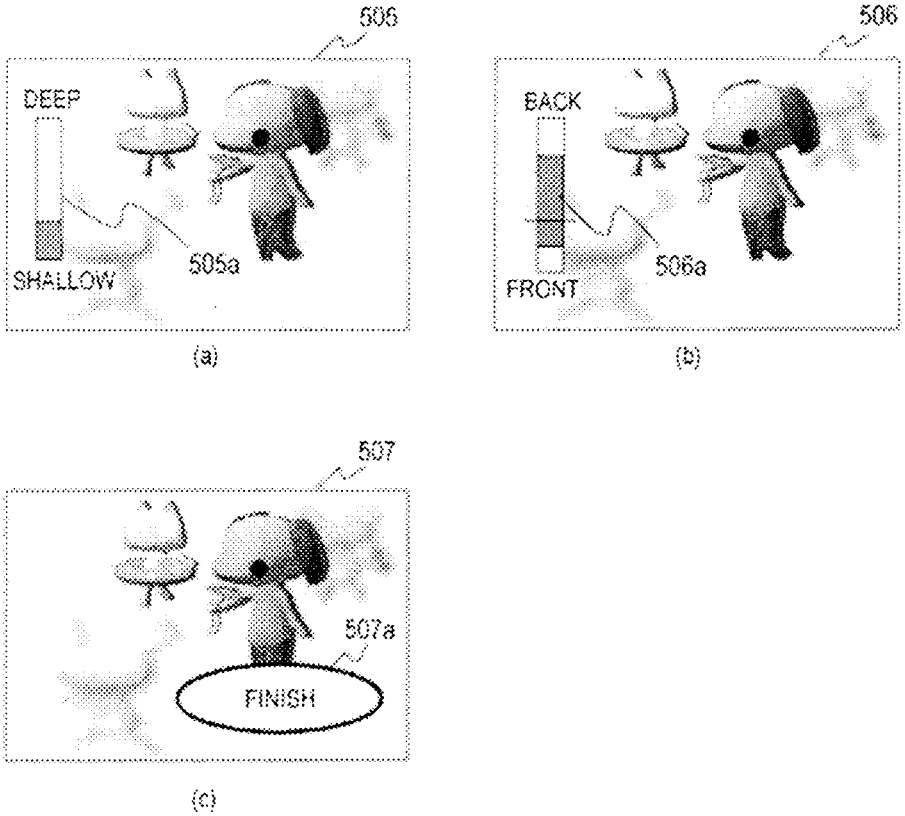
FIGS. 21(a) to (c) show examples of displaying images relating to setting the depth of field in a fourth embodiment of the invention.

Specifically, as shown in FIG. 21(a), in the display screen 505, when the depth of field is set according to the user operation (in this example, when the rotation center of the object plane is tapped twice), rough indication of the depth of field is superimposed on the display screen 505 as a graph indicator 505a. This allows the user to perform a more intended operation.

Specifically, in FIG. 21(a), when the rotation center of the object plane is first tapped by the user operation, the graph indicator 505a that varies depending on the interval between the taps is displayed on the display screen 505 (at the position that does not overlap the rotation center of the object plane). In this example, the graph indicator 505a is band graph-like and changes the indication from "Shallow" to "Deep" as time elapses from the first tapping to help the user set the depth of field.

The graph indicator 505a is not limited to indicating that the depth of field is "Shallow" or "Deep". As seen from a display screen 506 shown in FIG. 21(b), the graph indicator 506a may indicate the range within which focus is achieved between the "Front" and the "Back" of the object plane. A specific value may also be indicated as well as the intuitive graph indicator. As an example of such a value, "the depth of field corresponding to F2.8 with the angle of view corresponding to 85 mm by 35 mm size conversion" may be indicated. The angle of view by 35 mm size conversion may be automatically calculated from the imaging information of the image data, and the F-number with that angle of view may be displayed.

For setting the depth of field by tapping twice the center of the object plane, tapping once the center of the object plane may be taken as an request for finishing the rotation of the object plane. Then, as shown in FIG. 21(c), a "Finish" button 507a is separately superimposed on a display screen 507. This "Finish" button 507a may also move to a desired position on the display screen 507 by dragging. This prevents the "Finish" button 507a from interfering the correction of the rotation center of the object plane. Also, the confirmation of the effect of tilting the object plane can be achieved completely in every corner by moving the button.

(Fifth Embodiment)

Next, a fifth embodiment of the invention is described.

The configuration of an image processing apparatus in accordance with the fifth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

The image processing apparatus and the image processing method in accordance with the fifth embodiment are characterized in that, instead of superimposing the "Finish" button on the displayed image, tapping twice and requesting for finishing the rotation of the object plane are performed using the same user interface (UI).

Figure 22:
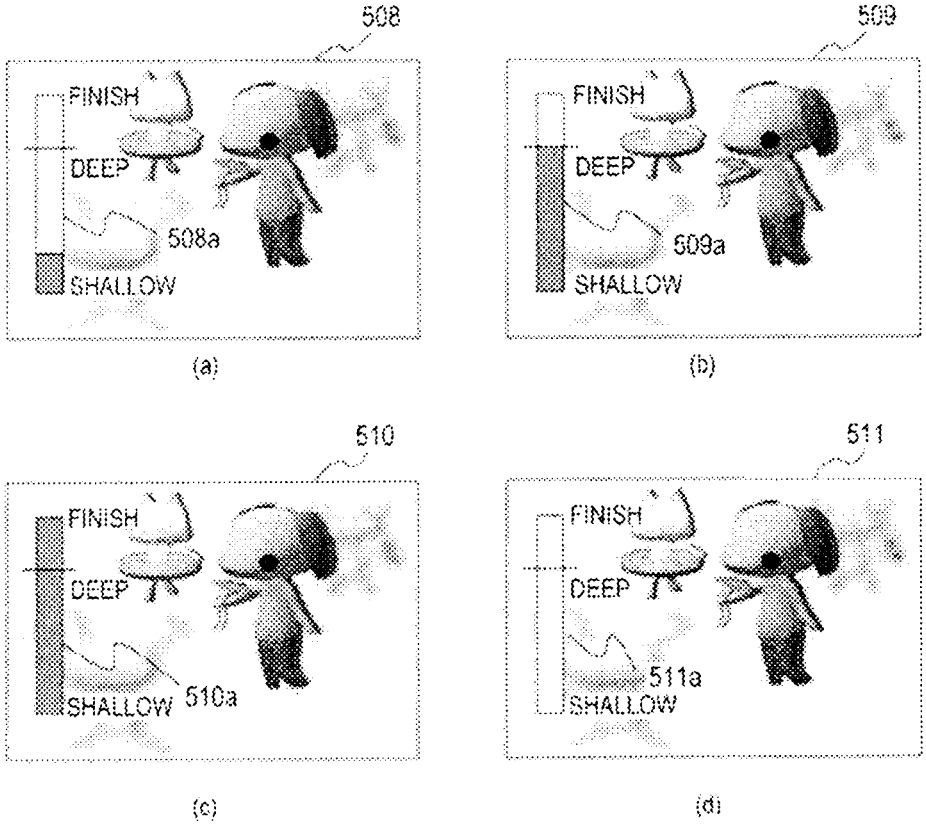
FIGS. 22(a) to (d) show examples of displaying images relating to setting and finishing setting the depth of field in a fifth embodiment of the invention.

Specifically, as shown in FIG. 22(a), on a display screen 508, a first tapping on the touch panel 76 causes a graph indicator 508a to provide an indication for helping the user set the depth of field between "Shallow" and "Deep," and to display "Finish" on the top of the graph indicator 508a for the user to request to finish the rotation of the object plane.

Then, as shown in FIG. 22(b), on a display screen 509, the indication of a graph indicator 509a gradually changes from "Shallow" to "Deep" as time elapses from the first tapping on the touch panel 76, and holds "Deep" for a predetermined period. If a second tapping has been performed on the touch panel 76 up to this time, the CPU 62a detects that the depth of field has been set, and performs the image processing (corresponding to step S207 of FIG. 16).

If a predetermined time required for the user to set the depth of field to "Deep" (for example, one second) has elapsed with no second tapping performed on the touch panel 76, an indication of a graph indicator 510a on a display screen 510 is gradually changed towards "Finish," as shown in FIG. 22(c). If the second tapping has been performed on the touch panel 76 during this period, the depth of field is set to "Deep".

Figure 16:
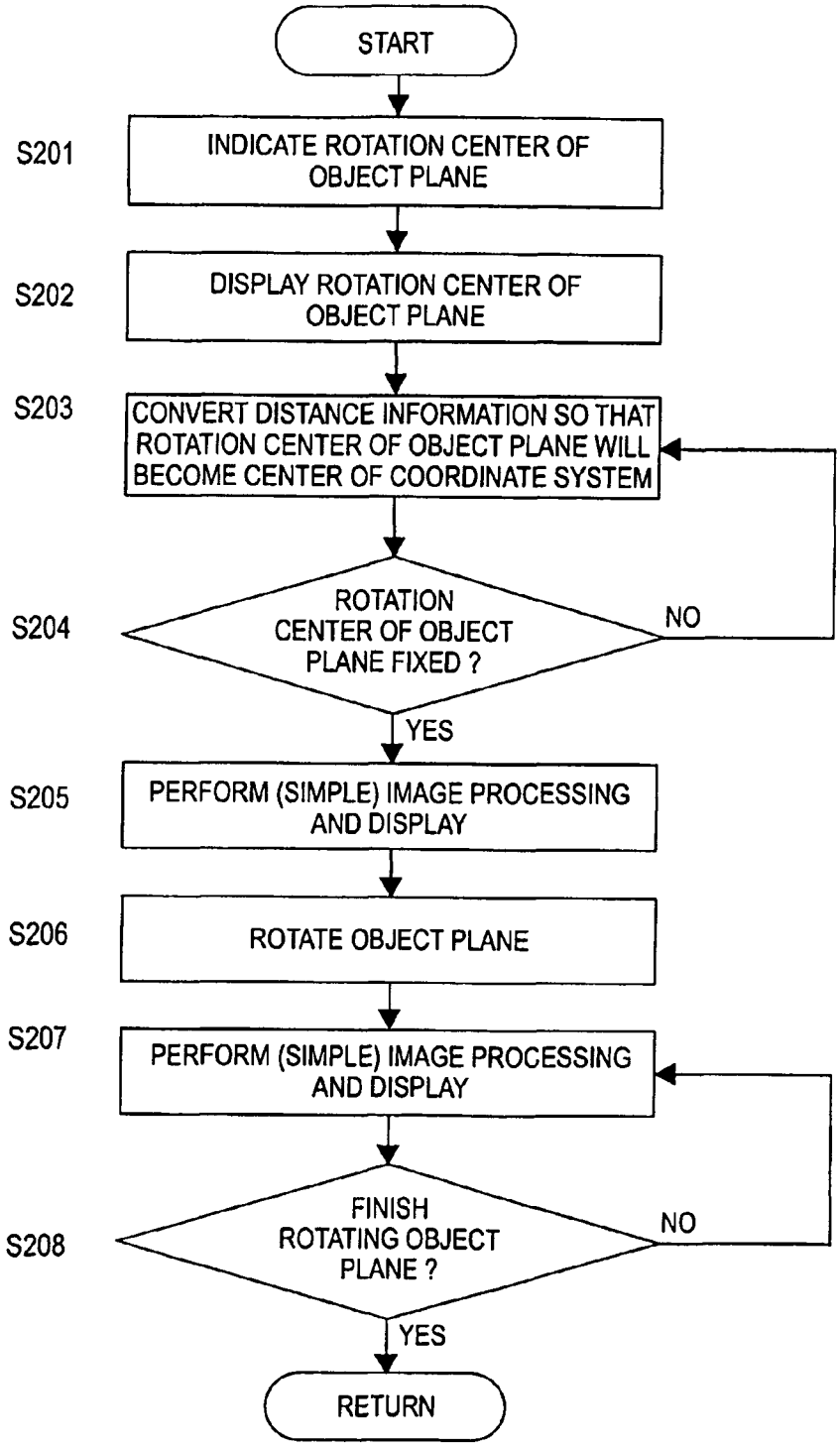
FIG. 16 is a flowchart describing in detail a process relating to the manipulation of the object plane.

If the indication has reached "Finish" with no second tapping performed on the touch panel 76, the CPU 62a takes this as a request for finishing the rotation of the object plane (corresponding to step S208 of FIG. 16).

Thus, in the image processing apparatus and the like in accordance with the fifth embodiment, after a predetermined time elapses, the indication changes to that for requesting to finish the rotation of the object plane (corresponding to step S208 of FIG. 16), which eliminates the need for displaying "Finish" button, avoiding causing complicated screen display. Of course, the depth of field may be set by specifying focal length and aperture by 35 mm size conversion through a menu operation by the user.

A method for setting the depth of field is not limited to setting according to the time length for tapping twice. For example, a first tapping may cause a display screen 511 shown in FIG. 22(d) to be displayed, and a second tapping on the touch panel 76 may be performed on a graph indicator 511a in which the depth of field can be set between "Shallow" and "Deep", and "Finish" is displayed. With this method, both setting the depth of field and requesting finishing the rotation of the object plane can be performed in one UI without taking time for changing the indication for requesting finishing the rotation of the object plane.

Furthermore, when tapping the rotation center of the object plane (for fixing the object plane in step S204 of FIG. 16, setting the depth of field, and requesting to finish the rotation of the object plane), a tap range that is determined to be "the rotation center of the object plane" may be displayed.

Figure 23:
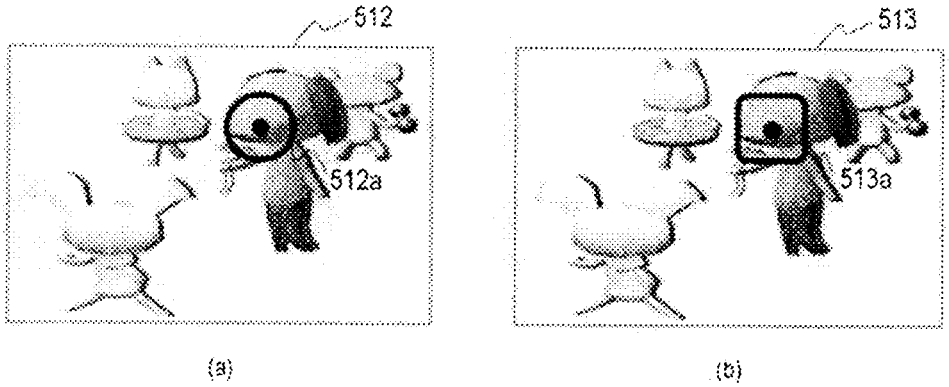
FIGS. 23(a) and (b) show examples of displaying images relating to setting the object plane in the fifth embodiment of the invention.

Specifically, FIG. 23(a) is an example of displaying the tap range that is determined to be "the center of the object plane" as an circle 512a in a display screen 512. FIG. 23(b) is an example of displaying the tap range that is determined to be "the rotation center of the object plane" as a rectangle 513a in a display screen 513.

When tapping is performed within this range on the touch panel 76, the CPU62a determines that "the center of the object plane" is tapped and performs an appropriate processing. When tapping is performed outside the range, other processing (such as rotating or tilting the object plane) is performed.

Again, of course, various screen displays such as "Cancel," "Back," "Hide," and "Finish" (buttons), and rough indication of the depth of field are placed desirably outside the range that is determined to be "the center of the object plane".

(Sixth Embodiment)

Next, a sixth embodiment of the invention is described.

The configuration of an image processing apparatus in accordance with the sixth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

Figure 24:
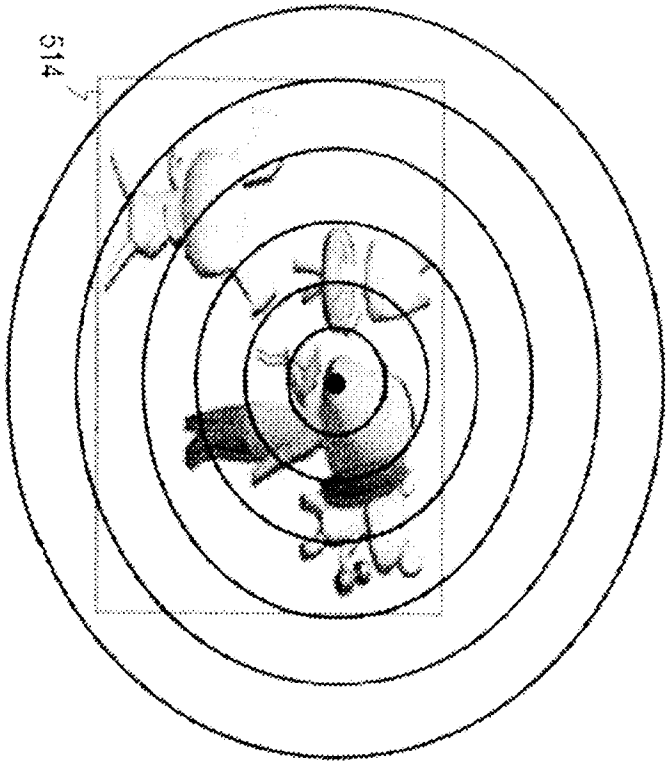
FIG. 24 shows an example of displaying the amount of tilt of the object plane in a sixth embodiment of the invention.

In the image processing apparatus and the image processing method in accordance with the sixth embodiment, when the object plane is rotated (tilted) according to step S206 of FIG. 16, the angle of the rotation (amount of tilting the object plane) can be specified by tapping (touching) intensity on the touch panel 76, and the tilt amount can be specified by tap location as well, as shown in FIG. 24.

Specifically, the sixth embodiment helps the user operation by gradually displaying the angle of tilting the object plane on a display screen 514, as shown in FIG. 24.

The proximity of the center of the object plane is a tap range that is determined to be "the rotation center of the object plane". The further from there, the larger the amount of tilt (angle of rotating/tilting the object plane) is specified. In other words, the amount of tilt is set depending on the distance from the coordinates of the center of the object plane to the coordinates of the tap position (X, Y). For example, the amount of tilt may be one degree for proximity to the rotation center of the object plane, two degrees for far areas, and three degrees for further areas.

The angle of the rotation, that is the angle of coordinate conversion based on solid analytic geometry, may be set so as to change gradually from the rotation center of the object plane, and more preferably, can be precisely adjusted according to the distance from the rotation center of the object plane to the tap location. Also, even when gradually indicated, the angle may actually be set more precisely than what is indicated.

Thus the sixth embodiment provides intuitive operation to the user by changing the tilt angle in proportion to the distance from the rotation center of the object plane to the tap location.

The rotation angle of the object plane can be changed according to the angle of view of the captured image (recorded as metadata in step S101 of FIG. 15). For example, in actual lenses, the amount of tilt of the object plane when a lens is tilted varies among 24 mm, 45 mm, and 90 mm lenses. With the same tilt angle between the lens and imaging device (e.g., 10 degrees), the wider angle the lens has, the more the amount of tilt of the object plane is.

(Seventh Embodiment)

Next, a seventh embodiment of the invention is described.

The configuration of an image processing apparatus in accordance with the seventh embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

In photography, imaging may be performed with the horizontal and vertical directions precisely predetermined. Also, in manipulation of the object plane using an actual "camera movement (swing, tilt)" lens, the horizontal and vertical directions may be more precisely predetermined. In view of the above, the image processing apparatus and the image processing method in accordance with the seventh embodiment is characterized in that, in step S205 of FIG. 16, as shown in FIG. 25(a), a horizontal line 515a and a vertical line 515b are displayed on a display screen 515.

The horizontal line 515a and the vertical line 515b may be displayed based on the position and angle of the camera recorded as metadata (from an output of a gyroscope, for example) in performing imaging (step S101 of FIG. 15). More simply, the horizontal line 515a and the vertical line 515b may be displayed as image information that passes through the rotation center of the object plane. When the displayed horizontal line 515a or vertical line 515b are tapped on the touch panel 76, the rotation angle of the object plane is fixed by the CPU 62a.

Figure 25:
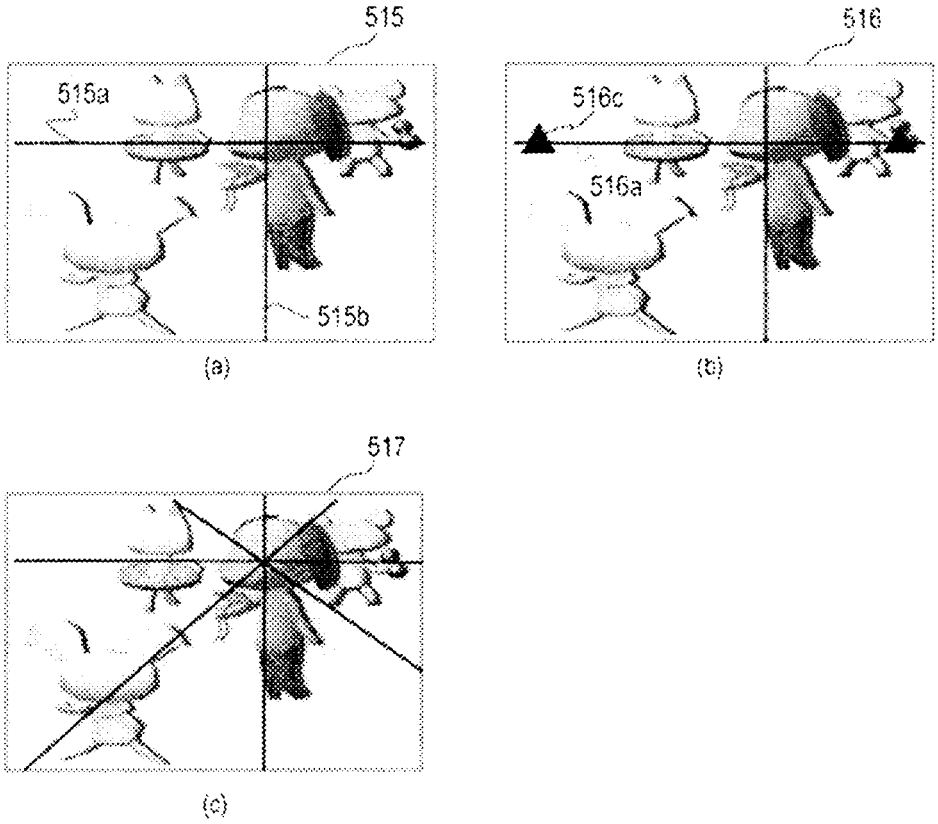
FIGS. 25(a) to (c) show examples of displaying horizontal and vertical lines and the like for fixing the object plane in a seventh embodiment of the invention.
Figure 26:
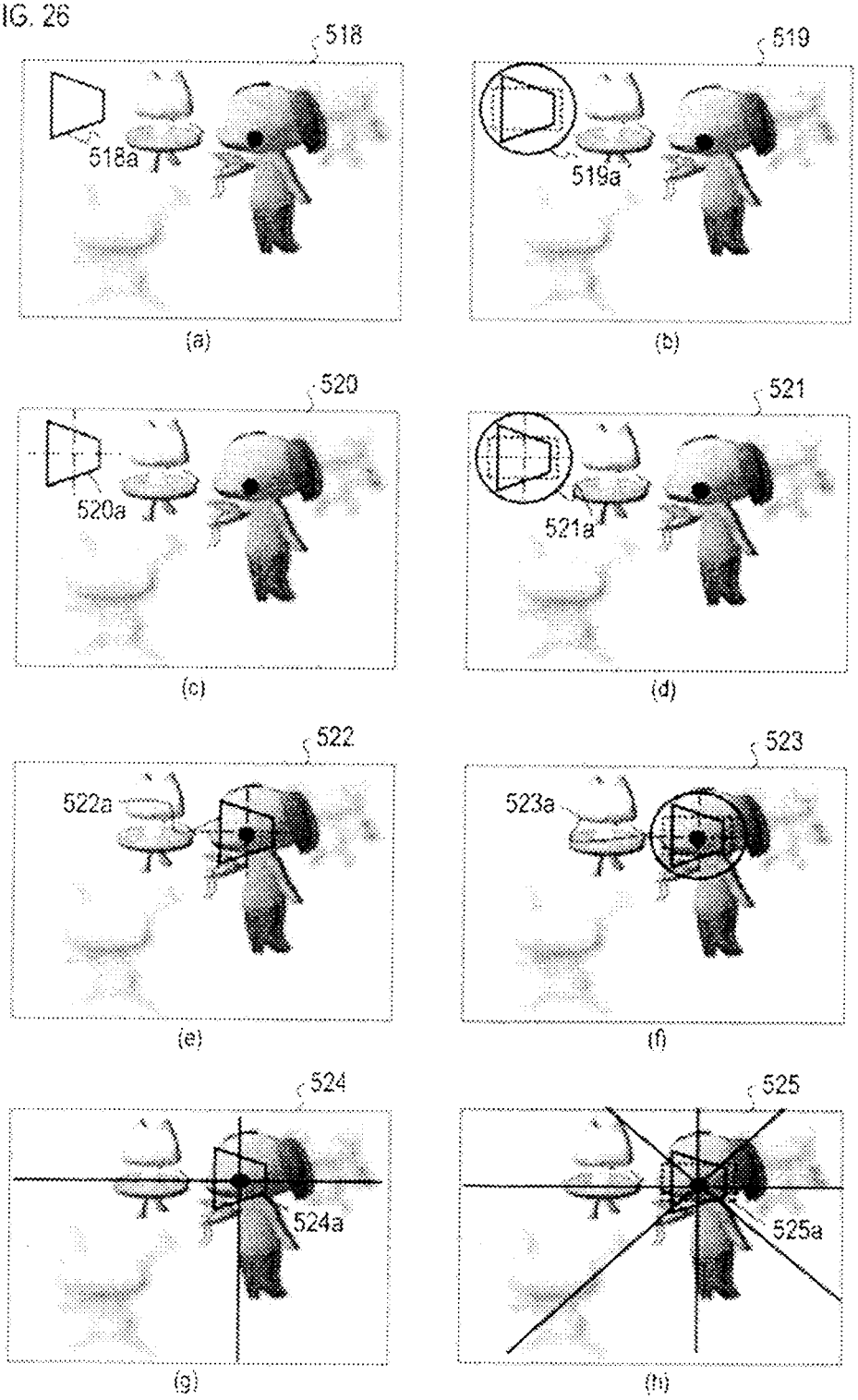
FIGS. 26(a) to (h) show examples of displaying the object plane in an eighth embodiment of the invention.

For example, as shown in FIG. 25(b), when a horizontal line 516a on a display screen 516 is tapped on the touch panel 76, the CPU 62a limits the direction of the rotation of the object plane so that the rotation will be performed only around the axis on the horizontal line 516a, and displays a mark 516c (in this example, triangle) for indicating that the rotation axis is limited to the horizontal line 516a.

With this state, the rotation of the object plane is performed only on the fixed line axis, and then, the angle of the rotation is determined by the distance from the line coordinate (Y in this case) to the tap location Y in this case). When the fixed line is tapped again on the touch panel 76, the CPU 62a releases the line.

As seen from a display screen 517 shown in FIG. 25(c), various lines may be displayed based on a menu operation without limiting horizontal line or vertical line. For example, some of actual "camera movement (swing, tilt)" lenses allow determining the angle for each predetermined angle. Such use would be familiar with the user.

(Eighth Embodiment)

Next, an eighth embodiment of the invention is described.

The configuration of an image processing apparatus in accordance with the eighth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

The image processing apparatus and the image processing method in accordance with the eighth embodiment is characterized in that, in rotating (tilting) the object plane (step S206 of FIG. 16), the state and angle of the object plane is displayed.

For actual "camera movement (swing, tilt)" lenses, the angle with which the object plane is tilted can be known only through a finder or captured image. On the other hand, in this embodiment, which provides similar effect by image processing, the angle of rotating the object plane (corresponding to step S206 of FIG. 15), that is the angle to be used for the coordinate conversion, is recorded to the RAM 62b. This allows obtaining information of the amount of tilting the object plane from the initial position, which is perpendicular to the optical axis of the lens of the camera, when converting the distance information of the image to the information on the distance from the object plane.

Specific examples of the displays are shown in FIGS. 26(a) to (h). On display screens 518 to 525, status indications 518a, 519a, 520a, 521a, 522a, 523a, 524a, and 525a are displayed, respectively, each of which indicates the state and angle of the object plane. The states of the object plane indicated by these status indicators 518a, 519a, 520a, 521a, 522a, 523a, 524a, and 525a are presented in three dimensions, which would be intuitive and user-friendly.

(Ninth Embodiment)

Next, a ninth embodiment of the invention is described.

The configuration of an image processing apparatus in accordance with the ninth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

In the above-described third to eighth embodiments, the object plane is assumed to be a simple plane. However, for the image processing apparatus and the image processing method in accordance with the ninth embodiment, the object plane is not limited to a simple plane. As a typical optical system (lens) has field curvature, the shape of the object plane for the imaging device, which is typically planar, will not be planar.

Figure 27:
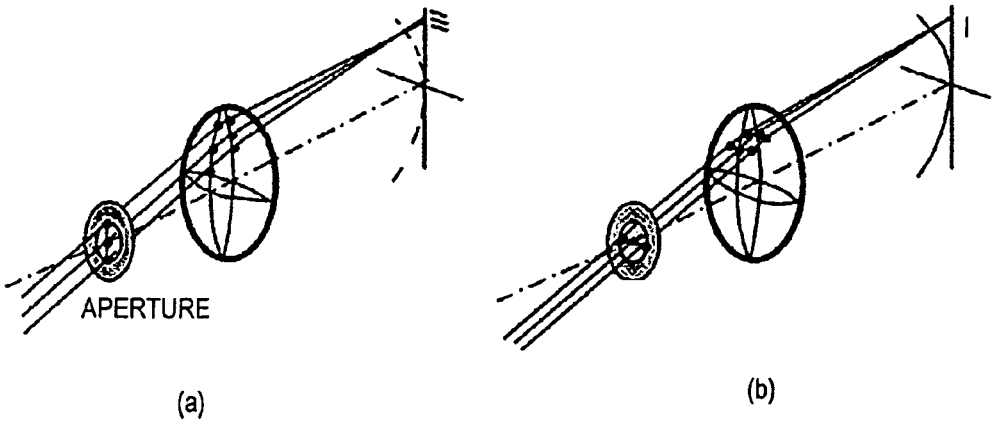
FIG. 27(a) is a conceptual drawing showing a meridional image plane.
FIG. 27(b) is a conceptual drawing showing a sagittal image plane.

FIGS. 27(a) and (b) are conceptual drawings of such field curvature. FIG. 27(a) shows a meridional image plane. FIG. 27(b) shows a sagittal image plane. Meridional image plane is also referred to as tangential image plane. Sagittal image plane is also referred to as radial image plane.

Meridional plane is a plane containing an optical axis and a main light beam. The meridional image plane is an image plane that gathers the most meridional light beams that run in the meridional plane. Sagittal plane is a plane perpendicular to the meridional plane. The sagittal image plane is an image plane that gathers the most sagittal light beams that run in the sagittal plane.

In the ninth embodiment, the shape of the object plane is assumed to be curved like actual lenses, instead of being planer. Accordingly, when the coordinate conversion on the distance information (depth map) is performed so that the rotation center of the object plane will be the center of the three-dimensional coordinate system in step S203 of FIG. 16

(that is, when the distance information for each pixel of the captured image is converted to the information on the distance from the object plane), the calculation is performed considering the shape of the object plane.

The shape of the object plane is maintained as data representing the relation between the image height (distance from the center of the image) and the shape of the object plane. It is maintained as with the distance information (depth map) so as to represent the relation between the location (X, Y) in the image and the shape of the object plane (Z).

Figure 28:
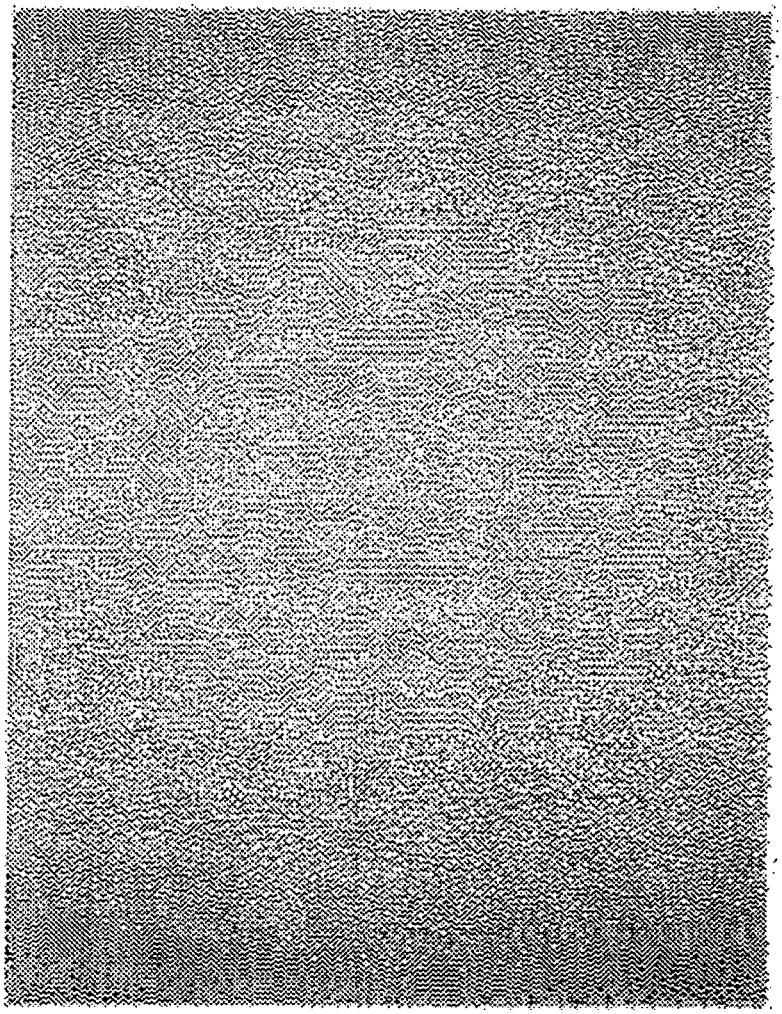
FIG. 28 shows the shape of the object plane represented like the depth map.
Figure 29:
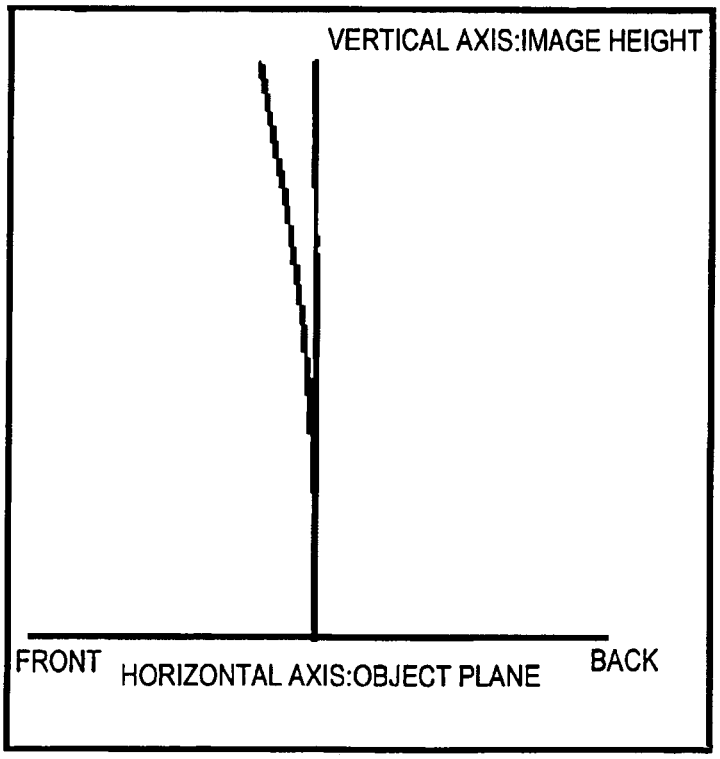
FIG. 29 conceptually shows the shape of the object plane.

FIG. 28 shows the shape of the object plane represented like the depth map. In this figure, black represents the front, and white represents the back. For the shape of the object plane, only the relation between the image height and the shape of the object plane (as shown in FIG. 29) needs to be represented, and maintaining data as much as the distance information is not required.

Data for regions into which the whole image is horizontally and vertically divided may be maintained, or only the relation between the image height and the shape of the object plane may be maintained. The shape of the object plane may be maintained and recorded in the RAM 62b, or may be obtained from the outside through the external I/F 69.

Specifically, the CPU 62a performs the following calculations.

(1) First, the values of the coordinates (X, Y, Z) of the pixel set to the center of the object plane is subtracted from the coordinate information of all pixels so that the coordinates (X, Y, Z) will be the origin (0, 0, 0) of the three-dimensional coordinate system. This converts the information on the distance from the camera to the information on the distance from the plane that passes through the coordinates of the center of the object plane and perpendicular to the optical axis of the lens used for the imaging.

(2) Then, the shape of the object plane is added to or subtracted from the coordinate information (X, Y, Z) of each pixel location in the image (the order of this subtraction may be reversed depending on how to hold the data of the shape of the object plane). This converts the information on the distance from the plane that passes through the coordinates of the center of the object plane and perpendicular to the optical axis of the lens used for the imaging to the information on the distance from the object plane.

Including the calculation of the shape of the object plane increases a processing load. However, in order to allow the user to confirm the effect of the image processing and in order to help comfortable user operation, it is preferable to calculate the shape of the object plane at this stage. The calculations (1) and (2) can be performed at the same time.

Two types of calculation methods may be used for the calculation (2).

Align the rotation center of the object plane designated in step S201 of FIG. 16 (or corrected in step S204) over the center of the shape of the object plane, and proceed the process.

Absolutely align the center of the image over the center of the shape of the object plane, and proceed the process.

In actual optical systems, the center of the image is aligned over the center of the shape of the object plane as with the latter. So the effect given by the latter is preferable to the user. Then the following description is based on the latter. However, in order to meet the need for a different effect than actual lenses, aligning the rotation center of the object plane over the center of the shape of the object plane may be allowed by specifying through a menu operation.

In actual "camera movement (swing, tilt)" lenses, when camera movement is used, the rotation center of the object plane moves away from the center of the image depending on the focal length, the tilt angle of the object plane, and the imaging distance (that is, the distance to the object). Preferably, the embodiment that provides the "camera movement (swing, tilt)" effect by the image processing also provides a means for allowing the reproduction of such behavior.

Thus, when the object plane is rotated in step S206 of FIG. 16, the rotation center of the object plane is moved away from the center of the image depending on the angle of view of the image (recorded as metadata in step S101 of FIG. 15) and the rotation angle of the object plane.

When the object plane is rotated in step S206 of FIG. 16, the shape of the object plane is subtracted from or added to the coordinate information (X, Y, Z) of each pixel location in the image (this may be reversed depending on how to hold the data of the shape of the object plane). This converts the information on the distance from the object plane to the information on the distance from the plane that passes through the coordinates of the center of the object plane and perpendicular to the optical axis of the lens used for the imaging. In other words, the object plane is temporarily restored to the original planar shape.

Then, by the coordinate conversion based on solid analytic geometry, the distance information is converted to the information on the distance from the plane that passes through the coordinates of the center of the object plane and is rotated by the angle specified/operated by the user for each pixel. In other words, the coordinate conversion for rotation is performed in the state of being planar.

The relation between the rotation angle of the object plane and the amount of the movement of the rotation center of the object plane from the center of the image may be maintained and recorded in the ROM 62b in advance, or may be obtained from the outside through the external I/F 69. The CPU 62a maintains this relation so that the amount of coordinate movement (X, Y) from the center of the image can be known from the rotation angle of the object plane.

The shape of the object plane that is moved (X, Y) from the center of the image depending on the rotation angle of the object plane is added to or subtracted from the coordinate information (X, Y, Z) of each pixel location in the image (this maybe reversed depending on how to hold the data of the shape of the object plane). This converts the information on the distance from the plane that passes through the coordinates of the center of the object plane and is rotated by the angle specified/operated by the user to the information on the distance from the object plane. In other words, finally, the object plane is restored to its shape again.

However some (more than a few) users would need to manipulate the shape of the object plane. So, it is also preferable to provide a capability of changing the shape of the object plane. Then, in the image processing apparatus and the image processing method in accordance with this embodiment, when the center of the object plane is kept pressed (without tapping and dragging) in step S204 or S206 of the FIG. 16, as shown in FIG. 30(a), the CPU 62a controls so as to display a display frame 526a for the current shape of the object plane on a display screen 526 of the LCD 68.

Figure 30:
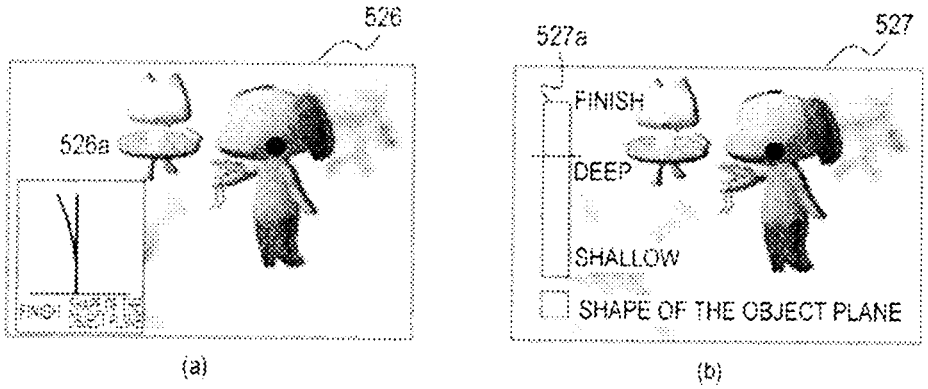
FIGS. 30(a) and (b) show examples of displaying images relating to changing the shape of the object plane in a ninth embodiment of the invention.

In the display screen 526 shown in FIG. 30(a), the display frame 526a for the shape of the object plane can be moved by, for example, dragging the display frame. When the shape of the object plane displayed on the display frame 526a is tapped or dragged, the CPU 62a changes the shape of the object plane. The result of changing the shape of the object plane can be quickly confirmed by the user by performing the image processing in step S205 or S207 of FIG. 16.

The operation of displaying the shape of the object plane is not limited to keeping the center of the object plane pressed. "Shape of the object plane" button may also be displayed on the display screen 526. The "Shape of the object plane" button is placed desirably outside the range that is determined to be "the center of the object plane".

Also, a first tapping on the center of the object plane may cause a screen 527 to be displayed as shown in FIG. 30(b) and a second tapping may make a graph indicator 527a, displaying the setting of the depth of field from "Shallow" to "Deep," "Finish," and "Shape of the object plane," available for input relating the depth of field. This allows setting the depth of field, requesting finishing the rotation of the object plane, and requesting displaying the shape of the object plane in one UI.

Furthermore, including buttons such as "Cancel" and "Hide" in the screen display caused by the first tapping allows manipulating the object plane in the same UI.

(Tenth Embodiment)

Next, a tenth embodiment of the invention is described.

The configuration of an image processing apparatus in accordance with the tenth embodiment is similar to that of the third embodiment (FIGS. 13 and 14). Then in the following description, these figures are referred as appropriate. Also, when referring to the flowcharts shown in FIGS. 15 and 16, features are described with reference to the steps in these figures.

The rotation center of the object plane and the like may be designated by a means other than designation by the user. For example, the center of the object plane and the rotation angle of the object plane may be fixed based on a specific point (characteristic point) detected using a detection technique such as "facial recognition".

Then in the image processing apparatus and the image processing method in accordance with the tenth embodiment, the CPU 62a recognizes the object by extracting specific points based on the brightness and contrast in the image, and matching the positions (positional relation) of the specific points with the pattern stored in the RAM 62b.

Figure 31:
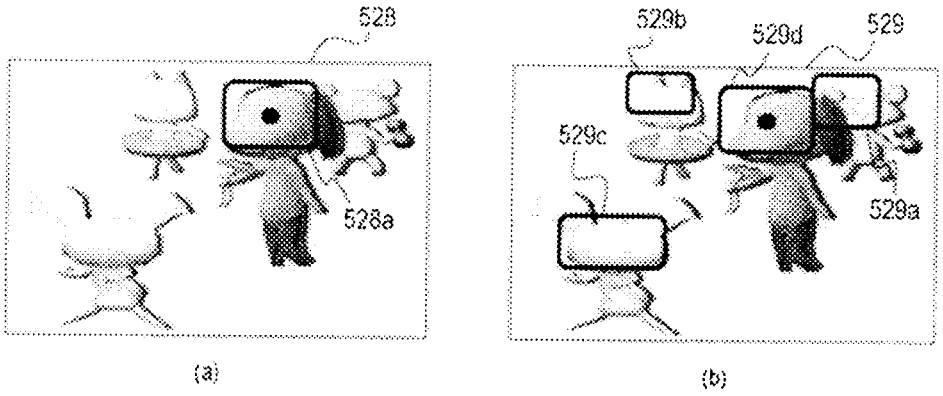
FIGS. 31(a) and (b) show examples of displaying images relating to setting the object plane in a tenth embodiment of the invention.

In an example shown in FIG. 31(a), a face is recognized by the positional relation between his/her both eyes, nose, and mouth, and the center of object plane is set to the center of the face. In the screen 528, the recognition area of the face is indicated by a rectangular frame 528a.

Also, as shown in FIG. 31(b), by recognizing two or more objects in a screen 529, the object plane and the depth of field can be set so as to contain the detected specific points (e.g., eyes, noses, and mouths) of the objects or object areas (e.g., faces). In the screen 529, the recognition areas of two or more faces are indicated by rectangular frames 529a to 529d.

Figure 32:
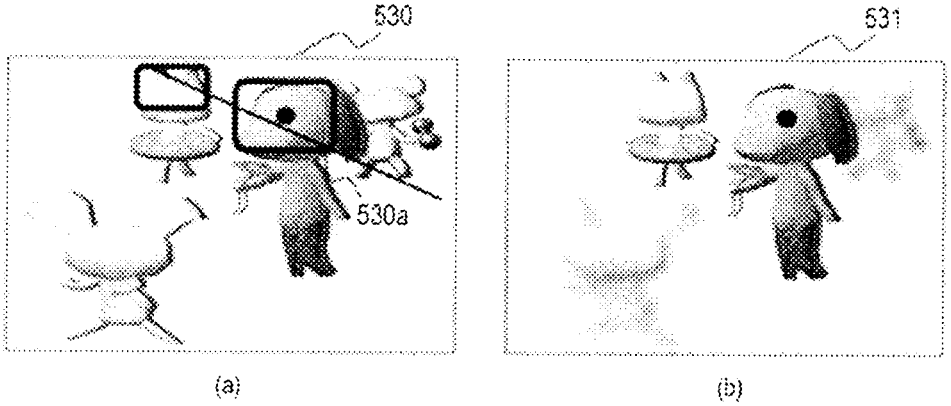
FIGS. 32(a) and (b) show examples of displaying other images relating to setting the object plane in the tenth embodiment of the invention.

Furthermore, as shown in FIG. 32(a), for example, when two object areas (e.g., face) are detected, the CPU 62a places the rotation axis of the object plane on the line connecting the two point on a display screen 530 using the coordinate conversion based on solid analytic geometry, and displays the rotation axis 530a to allow the user to perform rotation. Then the CPU 62a displays an image blurred according to the rotation of the object plane, as shown in FIG. 32(b), on a display screen 531.

Figure 33:
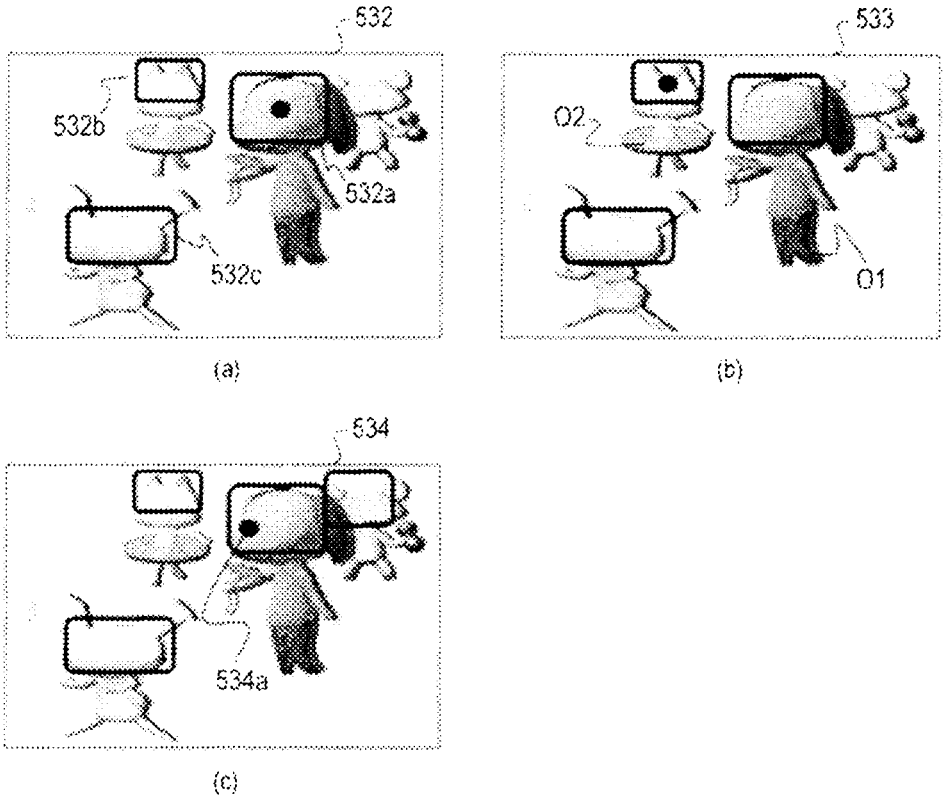
FIGS. 33(a) to (c) show examples of displaying other images relating to setting the object plane in the tenth embodiment of the invention.

Furthermore, as shown in FIG. 33(a), for example, when three object areas (e.g., face) are detected, the CPU 62a displays two or more face recognition areas as rectangular frames 532a to 532c on a display screen 532, and places the object plane on a plane defined by the three points using the coordinate conversion based on solid analytic geometry.

At this point, the CPU 62a may determine an object having the highest proportion of a screen 532 to be the main object, and set the rotation center of the object plane to the center of the detected area of the main object. Then, from this point, the user can manipulate the object plane and set the depth of field. Also, when the detected area is designated, the CPU 62a can select the main object (e.g., the coordinates of the center of the detected area of the object) within that area.

For example, as shown in FIG. 33(b), when, in a display screen 533, an object $O_2$ located in the back is designated by user operation rather than an object $O_1$ having a higher proportion of the object, the CPU 62a selects the object $O_2$ (e.g., the coordinates of the center of the detected area of the object $O_2$) as the main object and sets the rotation center of the object plane to the object $O_2$.

Furthermore, as shown in FIG. 33(c), when, in a display screen 534, four object areas (e.g., face) are detected, the CPU 62a sets the object plane/depth of field that contains the coordinates of the centers of all of the detected areas using the coordinate conversion based on solid analytic geometry. The CPU 62a set the object plane so that the coordinates of the centers of the detected areas will be equidistant from the object plane (however, some of the coordinates of the centers of the detected areas may not be on the object plane). The depth of field is set so as to be equal to the distance from the object plane to the coordinates of the center of each detected area.

In this case, the rotation center of the object plane (534a) is set at the position being at the minimum distance from the set object plane, as shown in FIG. 33(c), instead of one of the coordinates of the centers of the detected areas. Even in this case, according to further designation among the detected areas, the CPU 62a can also select the main object and reset the rotation center of the object plane.

Figure 34:
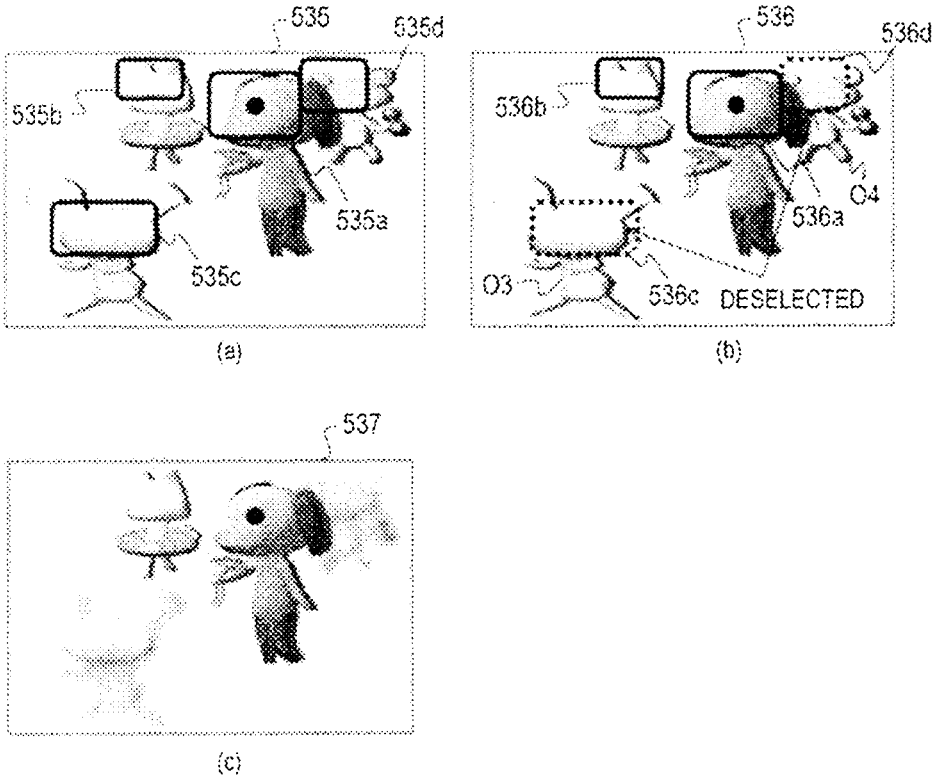
FIGS. 34(a) to (c) show examples of displaying images relating to unsetting the object plane in the tenth embodiment of the invention.
Figure 35:
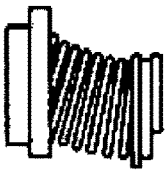
FIG. 35 shows various types of camera movement.
Figure 35:
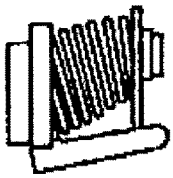
Figure 35:
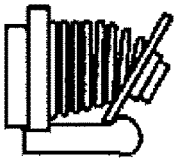
Figure 35:
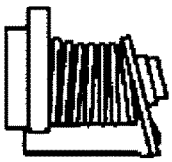
Figure 36:
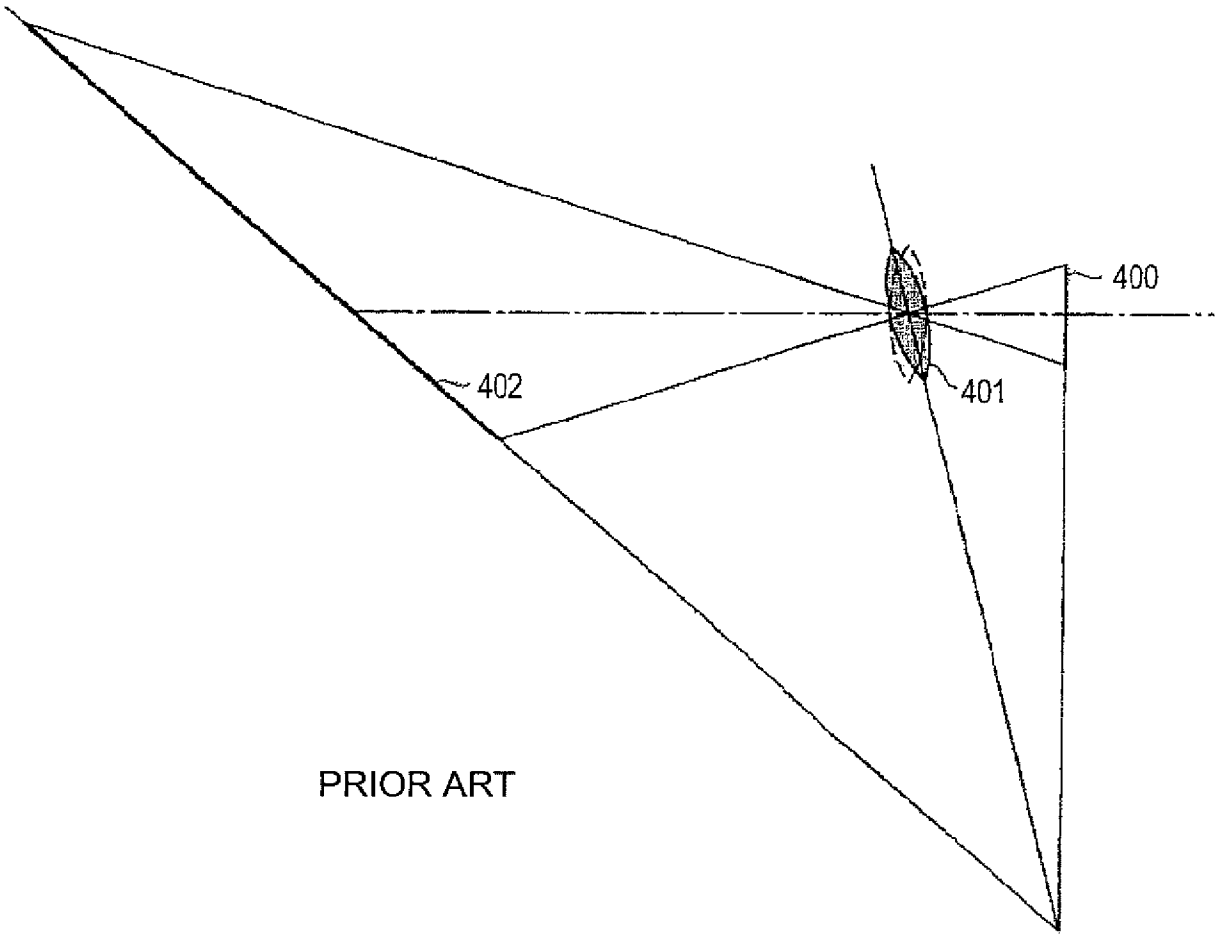
FIG. 36 is a conceptual drawings illustrating Scheimpflug principle.

Furthermore, as shown in FIG. 34(a), in a display screen 535, detected object areas (e.g., face) are indicated by rectangular frames 535a to 535d. For these object areas, when selecting a new object or deselecting an already recognized object is performed through a user operation, the CPU 62a resets an object to be used for setting the object plane. In the example of FIG. 34(b), among the objects displayed on a display screen 536, the detected areas of the objects $O_3$ and $O_4$ (rectangular frames 536c and 536d) are deselected.

Then the CPU 62a specifies the main object (coordinates of the center of the detected area of the object) among the reset objects, and displays a blurred image as shown in FIG. 34(c) on a display screen 537.

Of course, the image processing apparatus and the image processing method in accordance with the above-described fourth to tenth embodiments can be implemented with any combination of these embodiments. Also, though the description has been made on the premise that the touch panel 76 is used, the pointing device used for operational input is not limited to this, and similar convenience can be provided to the user, for example, by moving a cursor with the cross-shaped key 77 and specifying with the enter key 74.

The first to tenth embodiments of the invention has been described. These embodiments provide the following advantages.

Specifically, providing an image given the effect corresponding to "camera movement (swing, tilt)" by performing image processing eliminates the need for designing a special optical system and lens-barrel.

Eliminating the need for providing a complicated mechanism (in accordance with what is called Scheimpflug principle) eliminates the need for designing a special optical system intending "camera movement (swing, tilt)". Further, an image processing apparatus that can provide an image given the effect corresponding to "camera movement (swing, tilt)" using an image imaged by a compact and low-cost imaging apparatus can be provided.

Providing an image given the effect corresponding to "camera movement (swing, tilt)" by image processing eliminates the need for complicated operation before imaging. This reduces the risk of missing a photo opportunity.

The image processing apparatus can provide a method for allowing flexible manipulation of the object plane corresponding to "camera movement (swing, tilt)" manipulation using a specially designed optical system and lens-barrel based on a prior art.

For manipulating the object plane, the image processing apparatus can provide an operational environment that is intuitive and friendly to the user. For example, the touch panel allows a more intuitive operation.

Displaying the rotation center of the virtual object plane set by the user on the display screen allows the user to manipulate the object plane and recognize the state of the object plane more easily.

Displaying the state of operating the virtual object plane by the user on the display screen allows the user to manipulate the object plane and recognize the state of the object plane more easily.

Even for an image with a deep depth of field imaged by a compact imaging apparatus employing the combination of a small imaging device and a short focal length lens, the image processing that provides a virtually shallow depth of field can be performed by allowing setting a virtual depth of field.

Allowing setting the shape of the virtual object plane can provide the user with a wider variety of image creation capability.

It should be noted that the invention is not limited to the above-described first to tenth embodiments and that various improvements and modifications can be made without departing the spirit of the invention. For example, the invention can be implemented as a program of the processing used in the above-described image processing apparatus, a recording media on which the above program is recorded, a program for implementing the above-described image processing method, and a recording media on which the above program is recorded.

The invention claimed is:

1. An image processing apparatus comprising:

an image sensor that captures an image;

an object plane setting means for setting an object plane in said captured image based on distance information corresponding to a [point] *position* designated by a user in a displayed image based on image data *of the captured image*;

an object plane changing means for changing the object plane by rotating [the object plane] at a rotational angle specified by the user with the [point] *position* maintained in the object plane;

a distance information conversion means for converting the distance information *for at least one position* of the image data *external to the changed object plane* according to the changed object plane using the rotational angle; [and]

an image processing means for performing image processing on the image data based on the converted distance information, wherein the image processing comprises: blurring the image data not on the *changed* object plane with a blur amount according to the converted distance information, and not blurring the image data on the *changed* object plane[.]*; and*

[wherein] *a display control means for displaying* a graphical indication of the changing of the object plane [is displayed on a display screen] with the image data.

2. The image processing apparatus according to claim 1, wherein the distance information conversion means [converts] *is further configured to convert* the distance information for each [point] *position* of the image data based on [the] coordinates of the designated [point] *position*.

3. The image processing apparatus according to claim 1, wherein the object plane changing means [changes] *is further configured to change* the object plane by rotating [the object plane] on the designated [point] *position* as rotation center.

4. The image processing apparatus according to claim 3, wherein, when the object plane is changed by the object plane changing means, the distance information conversion means [converts] *is further configured to convert* the distance information for each [point] *position* of the image data based on [the] coordinates of the designated [point] *position* and the angle and *a* direction of the rotation.

5. The image processing apparatus according to claim 1, wherein the image processing means [blurs] *is further configured to blur* the image data such that the blur amount increases as [the] distance from the object plane increases.

6. The image processing apparatus according to claim 1, wherein the image processing means [blurs] *is further configured to blur* the image data so that [points] *positions* within a predetermined distance from the object plane [will be] *are* blurred with [the] *a* same blur amount.

7. The image processing apparatus according to claim 1, wherein the image processing means [adjusts] *is further configured to adjust* the blur amount based on depth of field information indicating a depth of field.

8. The image processing apparatus according to claim 1, further comprising:

a storage means for storing the image data and the distance information in association with each other;

a designation means for designating the [point] *position*; and a setting means for setting a tilt angle and a tilt direction of the object plane containing the [point] *position* with respect to an optical axis of a lens.

9. The image processing apparatus according to claim 8, wherein, when the [point] *position* is designated by the designation means and the tilt direction and the tilt angle of the object plane with respect to the optical axis of the lens is set by the setting means, the object plane setting means sets the object plane based on the tilt direction and *the* tilt angle.

10. The image processing apparatus according to claim 8, further comprising a ranging means for ranging distance, wherein distance information obtained by the ranging means is stored by the storage means in association with the image data.

11. The image processing apparatus according to claim 8, wherein the designation means is a touch panel, and, when a [point] *position* is designated in the captured image, the touch panel accepts [the] *a* location designation by detecting [the] coordinates.

12. The image processing apparatus according to claim 11, wherein the location designation by the designation means is performed by touching the touch panel a predetermined number of times.

13. The image processing apparatus according to claim 8, [further comprising a] *wherein the* display control means *is* for displaying [the] *a* location designated by the designation means on [the] *a* display *screen* along with the captured image, wherein the designation means accepts [the] change of the location based on [the] dragging of the designated [point] *position*.

14. The image processing apparatus according to claim 8, wherein the designation means and setting means are a touch panel, and wherein designating at least one [point] *position* in the captured image, changing [the] *a* designated location, and setting the tilt direction and the tilt angle of the object plane containing the designated [point] *position* with respect to the optical axis of the lens are performed by touching the touch panel a number of predetermined times.

15. The image processing apparatus according to claim 1, wherein the distance information conversion means converts the distance information for each given region including two or more pixels in the image data according to the object plane.

16. An image processing method comprising the steps of:

capturing an image with an image sensor;

an image processor setting an object plane in said captured image based on distance information corresponding to a [point] *position* designated by a user in a displayed image based on image data *of the captured image*;

changing the object plane by rotating [the object plane] at a rotational angle specified by the user with the [point] *position* maintained in the object plane*, in which the rotational angle is with respect to the object plane*;

converting the distance information of the image data according to the changed object plane*, wherein the converting the distance information of the image data according to the changed object plane includes, for a given point Pn on the object plane having coordinates Xn, Yn and Zn, subtracting coordinates of the position designed by the user from the coordinates Xn, Yn and Zn of the given point Pn to obtain coordinates Xn', Yn' and Zn', and subtracting, from a first coordinate of the coordinates Xn', Yn' and Zn', a product of a second coordinate of the coordinates Xn', Yn' and Zn' and a tangent of the rotational angle, the first coordinate being different from the second coordinate*; [and]

performing image processing on the image data based on the converted distance information, wherein the image processing comprises: blurring the image data *of an object* not on the *changed* object plane with a blur amount according to the converted distance information, and not blurring the image data *of an object* on the *changed* object plane[,]*; and*

[wherein] *displaying* a graphical indication of the changing of the object plane [is displayed on a display screen] with the image data.

17. [An image processing program stored on a] *A* non-transitory *computer-readable* medium *on which is stored an image processing program*, the program causing a computer to execute an image processing method comprising the steps of:

capturing an image with an image sensor;

setting an object plane in said captured image based on distance information corresponding to a [point] *position* designated by a user in a displayed image based on image data *of the captured image*;

changing the object plane by rotating [the object plane] at a rotational angle specified by the user with the [point] *position* maintained in the object plane*, in which the rotational angle is with respect to the object plane*;

converting the distance information of the image data according to the changed object plane*, wherein the converting the distance information of the image data according to the changed object plane includes, for a given point Pn on the object plane having coordinates Xn, Yn and Zn, subtracting coordinates of the position designed by the user from the coordinates Xn, Yn and Zn of the given point Pn to obtain coordinates Xn', Yn' and Zn', and subtracting, from a first coordinate of the coordinates Xn', Yn' and Zn', a product of a second coordinate of the coordinates Xn', Yn' and Zn' and a tangent of the rotational angle, the first coordinate being different from the second coordinate*; [and]

performing image processing on the image data based on the converted distance information, wherein the image processing comprises: blurring the image data *of an object* not on the *changed* object plane with a blur amount according to the converted distance information, and not blurring the image data *of an object* on the *changed* object plane[,]*; and*

[wherein] *displaying* a graphical indication of the changing of the object plane [is displayed on a display screen] with the image data.

*18. An image processing apparatus comprising:*

*an image sensor that captures an image;*

*a processing device that receives the image captured by the image sensor; and*

*a memory including instructions which, when executed by the processing device, control:*

*setting an object plane in said captured image based on distance information corresponding to a position designated by a user in a displayed image based on image data of the captured image;*

*changing the object plane by rotating at a rotational angle specified by the user with the position maintained in the object plane in which the rotational angle is with respect to the object plane;*

*converting the distance information of the image data according to the changed object plane, wherein the converting the distance information of the image data according to the changed object plane includes, for a given point Pn on the object plane having coordinates Xn, Yn and Zn, subtracting coordinates of the position designed by the user from the coordinates Xn, Yn and Zn of the given point Pn to obtain coordinates Xn', Yn' and Zn', and subtracting, from a first coordinate of the coordinates Xn', Yn' and Zn', a product of a second coordinate of the coordinates Xn', Yn' and Zn' and a tangent of the rotational angle, the first coordinate being different from the second coordinate;*

*image processing on the image data based on the converted distance information, wherein the image processing comprises: blurring the image data of an object not on the changed object plane with a blur amount according to the converted distance information, and not blurring the image data of an object on the changed object plane; and*

*displaying a graphical indication of the changing of the object plane with the image data.*

* * * * *